US012647809B2

(12) United States Patent
Babaei

(10) Patent No.: US 12,647,809 B2
(45) Date of Patent: Jun. 2, 2026

(54) CHANNEL STATE INFORMATION FEEDBACK FOR MULTICAST BROADCAST SERVICES

(71) Applicant: TOYOTA JIDOSHA KABUSHIKI KAISHA, Toyota (JP)

(72) Inventor: Alireza Babaei, Fairfax, VA (US)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 521 days.

(21) Appl. No.: 18/029,694

(22) PCT Filed: Nov. 17, 2021

(86) PCT No.: PCT/JP2021/042253

§ 371 (c)(1),
(2) Date: Mar. 31, 2023

(87) PCT Pub. No.: WO2022/107816

PCT Pub. Date: May 27, 2022

(65) Prior Publication Data

US 2023/0413091 A1     Dec. 21, 2023

Related U.S. Application Data

(60) Provisional application No. 63/115,490, filed on Nov. 18, 2020.

(51) Int. Cl.
*H04W 24/10*        (2009.01)
*H04L 5/00*        (2006.01)
(Continued)

(52) U.S. Cl.
CPC ........... *H04W 24/10* (2013.01); *H04L 5/0051* (2013.01); *H04W 4/06* (2013.01); *H04W 72/21* (2023.01);
(Continued)

(58) Field of Classification Search
CPC ....... H04W 24/10; H04W 72/21; H04W 4/06; H04W 74/0838; H04W 74/0836; H04W 74/0833; H04L 5/0051; H04L 12/189
(Continued)

(56) References Cited

U.S. PATENT DOCUMENTS

2008/0273482 A1*  11/2008  Lee ........................ H04W 72/30
                                                                          370/312
2013/0301448 A1*  11/2013  Sayana .................. H04B 7/024
                                                                          370/252
(Continued)

FOREIGN PATENT DOCUMENTS

JP          2019-532558 A       11/2019
WO      WO 2020/051739 A1       3/2020
WO      WO 2020/164716 A1       8/2020

OTHER PUBLICATIONS

Non Final Office Action issued in U.S. Appl. No. 19/236,561, dated Oct. 27, 2025.
(Continued)

*Primary Examiner* — Chi Tang P Cheng
(74) *Attorney, Agent, or Firm* — Finnegan, Henderson, Farabow, Garrett and Dunner, LLP

(57)                    ABSTRACT

A system, method and apparatus for wireless communications is provided. A user equipment (UE) receives one or more messages. The one or more messages include first configuration parameters for channel state information, reference signal (CSI-RS) measurement and CSI report in a first radio resource control (RRC) state. The one or more messages also include second configuration parameters for the CSI-RS measurement and the CSI report in a second RRC state. The UE transmits a first CSI report, based on the first configuration parameters, when the UE is in the first (Continued)

RRC state. The UE transmits a second CSI report, based on the second configuration parameters, when the UE is in the second RRC state.

2 Claims, 21 Drawing Sheets

(51) Int. Cl.
| | |
|---|---|
| *H04W 4/06* | (2009.01) |
| *H04W 72/21* | (2023.01) |
| *H04L 12/18* | (2006.01) |
| *H04W 74/0833* | (2024.01) |
| *H04W 74/0836* | (2024.01) |
| *H04W 74/0838* | (2024.01) |

(52) U.S. Cl.
CPC ....... *H04L 12/189* (2013.01); *H04W 74/0833* (2013.01); *H04W 74/0836* (2024.01); *H04W 74/0838* (2024.01)

(58) Field of Classification Search
USPC ......................................................... 370/252
See application file for complete search history.

(56) References Cited

U.S. PATENT DOCUMENTS

| | | | |
|---|---|---|---|
| 2014/0362799 A1 | 12/2014 | Kim et al. | |
| 2015/0049689 A1* | 2/2015 | Seo ....................... | H04L 5/0057 |
| | | | 370/329 |
| 2017/0303157 A1 | 10/2017 | Siomina et al. | |
| 2017/0353976 A1 | 12/2017 | Yerramalli et al. | |
| 2018/0069589 A1 | 3/2018 | Liu et al. | |
| 2018/0115430 A1 | 4/2018 | Seo | |
| 2019/0069250 A1 | 2/2019 | Dinan | |
| 2019/0149185 A1 | 5/2019 | Liu et al. | |
| 2021/0204327 A1 | 7/2021 | Shi et al. | |
| 2023/0019909 A1* | 1/2023 | Zhang .................. | H04L 5/0051 |
| 2023/0246764 A1* | 8/2023 | Laselva .............. | H04L 27/2675 |
| | | | 370/329 |

OTHER PUBLICATIONS

ZTE Corporation et al., "Dormant State for SCells", dated Feb. 15, 2019, 7 pages.
3rd Generation Partnership Project, "3GPP TS 38.214 V16.6.0", dated Jun. 2021 (including Section 5.1), pp. 1-172.
3rd Generation Partnership Project, "3GPP TS 38.321 V16.5.0", dated Jun. 2021 (including Section 5.3), pp. 1-157.
Final Office Action issued in U.S. Appl. No. 19/236,561, dated Mar. 11, 2026.

\* cited by examiner

| Transport channel / Logical channel | BCH | PCH | DL-SCH |
|---|---|---|---|
| BCCH | X | | X |
| PCCH | | X | |
| CCCH | | | X |
| DCCH | | | X |
| DTCH | | | X |

FIG. 3A

| Transport channel / Logical channel | UL-SCH | RACH |
|---|---|---|
| CCCH | X | |
| DCCH | X | |
| DTCH | X | |

FIG. 3B

| Transport channel / Logical channel | SL-BCH | SL-SCH |
|---|---|---|
| SBCCH | X | |
| SCCH | | X |
| STCH | | X |

FIG. 3C

| Physical channel | PDSCH | PDCCH | PBCH |
|---|---|---|---|
| Transport channel | | | |
| BCH | | | X |
| PCH | X | | |
| DL-SCH | X | | |

| Physical channel | PUSCH | PUCCH | PRACH |
|---|---|---|---|
| Transport channel | | | |
| UL-SCH | X | | |
| RACH | | | X |

| Physical channel | PSSCH | PSCCH | PSFCH | PSBCH |
|---|---|---|---|---|
| Transport channel | | | | |
| SL-BCH | | | | X |
| SL-SCH | X | | | |

| Physical Signal | DM-RS | PT-RS | PRS | CSI-RS | PSS | SSS | SRS | S-PSS | S-SSS |
|---|---|---|---|---|---|---|---|---|---|
| DL | X | X | X | X | X | X | | | |
| UL | X | X | | | | | X | | |
| SL | X | X | | X | | | | X | X |

FIG. 6

CHANNEL STATE INFORMATION FEEDBACK FOR MULTICAST BROADCAST SERVICES

CROSS-REFERENCE TO RELATED APPLICATIONS

This application is a national stage of International Application No. PCT/JP2021/042253, filed Nov. 17, 2021, and is based upon and claims the benefit of priority from U.S. Patent Application No. 63/115,490 filed Nov. 18, 2020, the entire contents of which are incorporated herein by reference.

TECHNICAL FIELD

The disclosure relates to a method of channel state information feedback.

BACKGROUND ART

Generally described, computing devices and communication networks can be utilized to exchange information. In a common application, a computing device can request/transmit data with another computing device via the communication network. More specifically, computing devices may utilize a wireless communication network to exchange information or establish communication channels.

Wireless communication networks can include a wide variety of devices that include or access components to access a wireless communication network. Such devices can utilize the wireless communication network to facilitate interactions with other devices that can access the wireless communication network or to facilitate interaction, through the wireless communication network, with devices utilizing other communication networks.

SUMMARY OF INVENTION

In some embodiments of this disclosure, a method for providing user equipment (UE) feedback is provided. The method includes: receiving, by a UE, one or more messages comprising: one or more first configuration parameters for first UE feedback in a radio resource control (RRC) connected state; and one or more second configuration parameters for second UE feedback in an RRC idle state or an RRC inactive state; transmitting, by the UE, the first UE feedback, based on the one or more first configuration parameters, when the UE is in the RRC connected state; and transmitting, by the UE, the second UE feedback, based on the one or more second configuration parameters, when the UE is in the RRC idle state or when the UE is in the RRC inactive state.

In some embodiments of this disclosure, a method for providing user equipment (UE) feedback associated with multicast broadcast services (MBSs) is provided. The method includes: receiving, by a UE, one or more configuration parameters for the UE feedback associated with the MBSs; determining, by the UE, based on the one or more configuration parameters, a first timing for transmission of the UE feedback associated with the MBSs; and dropping the UE feedback associated with the MBSs from transmission at the first timing when the first timing for the UE feedback collides with a second timing for an uplink channel or an uplink signal.

In some embodiments of this disclosure, a user equipment (UE) for a mobile communication network is provided. The UE includes: a memory storing instructions; and a processor configured to execute the instructions to: receive one or more messages comprising: one or more first configuration parameters for first UE feedback in a radio resource control (RRC) connected state; and one or more second configuration parameters for second UE feedback in an RRC idle state or an RRC inactive state; transmit the first UE feedback, based on the one or more first configuration parameters, when the UE is in the RRC connected state; and transmit the second UE feedback, based on the one or more second configuration parameters, when the UE is in the RRC idle state or when the UE is in the RRC inactive state.

In some embodiments of this disclosure, a user equipment (UE) for a mobile communication network is provided. The UE includes: a memory storing instructions; and a processor configured to execute the instructions to: receive one or more configuration parameters for UE feedback associated with the MBSs; determine, based on the one or more configuration parameters, a first timing for transmission of the UE feedback associated with the MBSs; and drop the UE feedback associated with the MBSs from transmission at the first timing when the first timing for the UE feedback collides with a second timing for an uplink channel or an uplink signal.

In some embodiments of this disclosure, a base station for a mobile communication system is provided. The base station includes: a memory storing instructions; and a processor configured to execute the instructions to: transmit, to a user equipment (UE), one or more messages comprising: one or more first configuration parameters for first UE feedback in a radio resource control (RRC) connected state; and one or more second configuration parameters for second UE feedback in an RRC idle state or an RRC inactive state; receive, from the UE, the first UE feedback, when the UE is in the RRC connected state; and receive, from the UE, the second UE feedback, when the UE is in the RRC idle state or when the UE is in the RRC inactive state.

In some embodiments of this disclosure, a base station for a mobile communication system is provided. The base station includes: a memory storing instructions; and a processor configured to execute the instructions to: transmit, to a user equipment (UE), one or more configuration parameters for UE feedback associated with multicast broadcast services (MBSs), wherein the UE is configured to determine, based on the one or more configuration parameters, a first timing for transmission of the UE feedback associated with the MBSs, and drop the UE feedback associated with the MBSs from transmission at the first timing, when the first timing for the UE feedback collides with a second timing for an uplink channel or an uplink signal.

In some embodiments of this disclosure, a system for mobile communication is provided. The system includes a base station configured to transmit one or more messages comprising: one or more first configuration parameters for first UE feedback in a radio resource control (RRC) connected state; and one or more second configuration parameters for second UE feedback in an RRC idle state or an RRC inactive state; and a user equipment (UE) configured to: receive the one or more messages; transmit the first UE feedback, based on the one or more first configuration parameters, when the UE is in the RRC connected state; and transmit the second UE feedback, based on the one or more second configuration parameters, when the UE is in the RRC idle state or when the UE is in the RRC inactive state.

In some embodiments of this disclosure, a system for mobile communication is provided. The system includes a base station configured to transmit one or more configuration parameters for UE feedback associated with multicast broadcast services (MBSs); and a user equipment (UE) configured to: receive the one or more configuration parameters; determine a first timing for transmission of the UE feedback associated with the MBSs; and drop the UE feedback associated with the MBSs from transmission at the first timing when to the first timing of the UE feedback collides with a second timing of an uplink channel or an uplink signal.

In some embodiments of this disclosure, a non-transitory computer readable medium is provided. The non-transitory computer readable medium stores a set of instructions that is executable by at least one processor of a user equipment (UE) in a mobile communication system to perform a method. The method includes: receiving one or more messages comprising: one or more first configuration parameters for first UE feedback in a radio resource control (RRC) connected state; and one or more second configuration parameters for second UE feedback in an RRC idle state or an RRC inactive state; transmitting the first UE feedback, based on the one or more first configuration parameters, when the UE is in the RRC connected state; and transmitting the second UE feedback, based on the one or more second configuration parameters, when the UE is in the RRC idle state or when the UE is in the RRC inactive state.

In some embodiments of this disclosure, a non-transitory computer readable medium is provided. The non-transitory computer readable medium stores a set of instructions that is executable by at least one processor of a user equipment (UE) in a mobile communication system to perform a method. The method includes: receiving, by the UE, one or more configuration parameters for UE feedback associated with multicast broadcast services (MBSs); determining, by the UE, based on the one or more configuration parameters, a first timing for transmission of the UE feedback associated with the MBSs; and dropping the UE feedback associated with the MBSs from transmission at the first timing when the first timing for the UE feedback collides with a second timing for an uplink channel or an uplink signal.

In some embodiments of this disclosure, a non-transitory computer readable medium is provided. The non-transitory computer readable medium stores a set of instructions that is executable by at least one processor of a base station in a mobile communication system to perform a method. The method includes: transmitting, to a user equipment (UE), one or more messages comprising: one or more first configuration parameters for first UE feedback in a radio resource control (RRC) connected state; and one or more second configuration parameters for second UE feedback in an RRC idle state or an RRC inactive state; receiving, from the UE, the first UE feedback, when the UE is in the RRC connected state; and receiving, from the UE, the second UE feedback, when the UE is in the RRC idle state or when the UE is in the RRC inactive state.

In some embodiments of this disclosure, a non-transitory computer readable medium is provided. The non-transitory computer readable medium stores a set of instructions that is executable by at least one processor of a base station in a mobile communication system to perform a method. The method includes: transmitting, to a user equipment (UE), one or more configuration parameters for UE feedback associated with multicast broadcast services (MBSs), wherein the UE is configured to determine, based on the one or more configuration parameters, a first timing for transmission of the UE feedback associated with the MBSs, and drop the UE feedback associated with the MBSs from transmission at the first timing, when the first timing for the UE feedback collides with a second timing for an uplink channel or an uplink signal.

BRIEF DESCRIPTION OF DRAWINGS

FIG. 3A, FIG. 3B and FIG. 3C show example mappings between logical channels and transport channels in downlink, uplink and sidelink, respectively, according to some aspects of one or more exemplary embodiments of the present disclosure.

FIG. 6 shows example physical signals in downlink, uplink and sidelink according to some aspects of one or more exemplary embodiments of the present disclosure.

DESCRIPTION OF EMBODIMENTS

The following disclosure provides many different embodiments, or examples, for implementing different features of the provided subject matter. Specific examples of arrangements are described below to simplify the present disclosure. These are merely examples and are not intended to be limiting.

Although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments.

Figure 1:
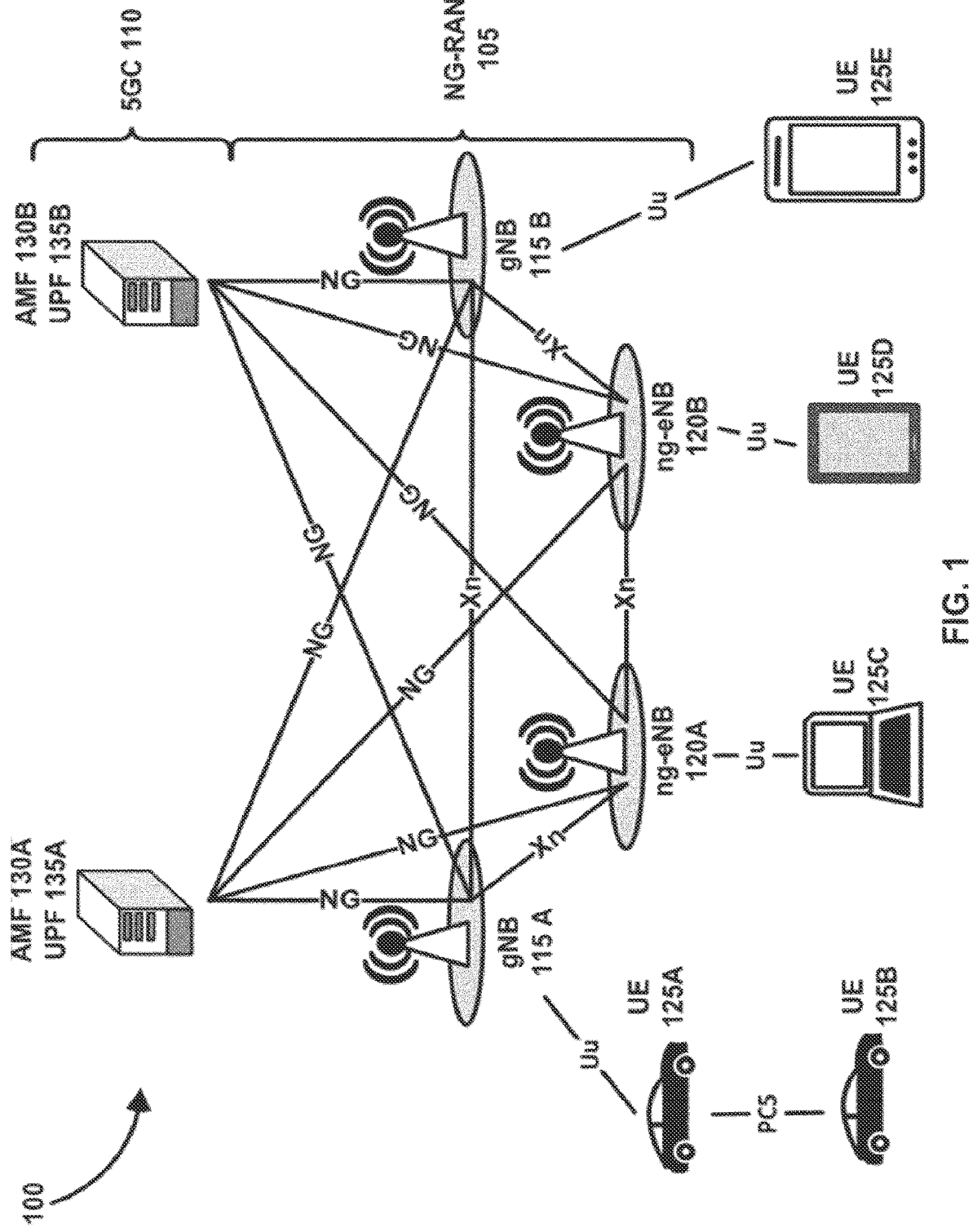
FIG. 1 shows an example of a system of mobile communications according to some aspects of one or more exemplary embodiments of the present disclosure.

FIG. 1 shows an example of a system of mobile communications 100 according to some aspects of one or more exemplary embodiments of the present disclosure. The system of mobile communication 100 may be operated by a wireless communications system operator such as a Mobile Network Operator (MNO), a private network operator, a Multiple System Operator (MSO), an Internet of Things (JOT) network operator, etc., and may offer services such as voice, data (e.g., wireless Internet access), messaging, vehicular communications services such as Vehicle to Everything (V2X) communications services, safety services, mission critical service, services in residential, commercial or industrial settings such as IoT, industrial JOT (HOT), etc.

The system of mobile communications 100 may enable various types of applications with different requirements in terms of latency, reliability, throughput, etc. Example supported applications include enhanced Mobile Broadband (eMBB), Ultra-Reliable Low-Latency Communications (URLLC), and massive Machine Type Communications (mMTC). eMBB may support stable connections with high peak data rates, as well as moderate rates for cell-edge users. URLLC may support application with strict requirements in terms of latency and reliability and moderate requirements in terms of data rate. Example mMTC application includes a network of a massive number of IoT devices, which are only sporadically active and send small data payloads.

The system of mobile communications 100 may include a Radio Access Network (RAN) portion and a core network portion. The example shown in FIG. 1 illustrates a Next Generation RAN (NG-RAN) 105 and a 5G Core Network (5GC) 110 as examples of the RAN and core network, respectively. Other examples of RAN and core network may be implemented without departing from the scope of this disclosure. Other examples of RAN include Evolved Universal Terrestrial Radio Access Network (EUTRAN), Universal Terrestrial Radio Access Network (UTRAN), etc. Other examples of core network include Evolved Packet Core (EPC), UMTS Core Network (UCN), etc. The RAN implements a Radio Access Technology (RAT) and resides between User Equipments (UEs) 125 (e.g., UE 125A-UE 125E) and the core network. Examples of such RATs include New Radio (NR), Long Term Evolution (LTE) also known as Evolved Universal Terrestrial Radio Access (EUTRA), Universal Mobile Telecommunication System (UMTS), etc. The RAT of the example system of mobile communications 100 may be NR. The core network resides between the RAN and one or more external networks (e.g., data networks) and is responsible for functions such as mobility management, authentication, session management, setting up bearers and application of different Quality of Services (QoSs). The functional layer between the UEs 125 and the RAN (e.g., the NG-RAN 105) may be referred to as Access Stratum (AS) and the functional layer between the UEs 125 and the core network (e.g., the 5GC 110) may be referred to as Non-access Stratum (NAS).

The UEs 125 may include wireless transmission and reception components for communications with one or more nodes in the RAN, one or more relay nodes, or one or more other UEs, etc. Example of the UEs 125 include, but are not limited to, smartphones, tablets, laptops, computers, wireless transmission and/or reception units in a vehicle, V2X or Vehicle to Vehicle (V2V) devices, wireless sensors, IoT devices, IIOT devices, etc. Other names may be used for the UEs 125 such as a Mobile Station (MS), terminal equipment, terminal node, client device, mobile device, etc. Still further, UEs 125 may also include components or subcomponents integrated into other devices, such as vehicles, to provide wireless communication functionality with nodes in the RAN, other UEs, satellite communications as described herein. Such other devices may have other functionality or multiple functionalities in addition to wireless communications. Accordingly, reference to UE may include the individual components facilitating the wireless communication as well as the entire device that incorporates components for facilitating wireless communications.

The RAN may include nodes (e.g., base stations) for communications with the UEs. For example, the NG-RAN 105 of the system of mobile communications 100 may comprise nodes for communications with the UEs 125. Different names for the RAN nodes may be used, for example depending on the RAT used for the RAN. A RAN node may be referred to as Node B (NB) in a RAN that uses the UMTS RAT. A RAN node may be referred to as an evolved Node B (eNB) in a RAN that uses LTE/EUTRA RAT. For the illustrative example of the system of mobile communications 100 in FIG. 1, the nodes of the NG-RAN 105 may be either a next generation Node B (gNB) 115 (e.g., gNB 115A, gNB 115B) or a next generation evolved Node B (ng-eNB) 120 (e.g., ng-eNB 120A, ng-eNB 120B). In this specification, the terms base station, RAN node, gNB and ng-eNB may be used interchangeably. The gNB 115 may provide NR user plane and control plane protocol terminations towards the UE 125. The ng-eNB 120 may provide E-UTRA user plane and control plane protocol terminations towards the UE 125. An interface between the gNB 115 and the UE 125 or between the ng-eNB 120 and the UE 125 may be referred to as a Uu interface. The Uu interface may be established with a user plane protocol stack and a control plane protocol stack. For a Uu interface, the direction from the base station (e.g., the gNB 115 or the ng-eNB 120) to the UE 125 may be referred to as downlink and the direction from the UE 125 to the base station (e.g., gNB 115 or ng-eNB 120) may be referred to as uplink.

The gNBs 115 and ng-eNBs 120 may be interconnected with each other by means of an Xn interface. The Xn interface may comprise an Xn User plane (Xn-U) interface and an Xn Control plane (Xn-C) interface. The transport network layer of the Xn-U interface may be built on Internet Protocol (IP) transport and General Packet Radio Service (GPRS) Tunneling Protocol (GTP) may be used on top of User Datagram Protocol (UDP)/IP to carry the user plane protocol data units (PDUs). Xn-U may provide non-guaranteed delivery of user plane PDUs and may support data forwarding and flow control. The transport network layer of the Xn-C interface may be built on Stream Control Transport Protocol (SCTP) on top of IP. The application layer signaling protocol may be referred to as XnAP (Xn Application Protocol). The SCTP layer may provide the guaranteed delivery of application layer messages. In the transport IP layer, point-to-point transmission may be used to deliver the signaling PDUs. The Xn-C interface may support Xn interface management, UE mobility management, including context transfer and RAN paging, and dual connectivity.

The gNBs 115 and ng-eNBs 120 may also be connected to the 5GC 110 by means of the NG interfaces, more specifically to an Access and Mobility Management Function (AMF) 130 (e.g., AMF 130A, AMF 130B) of the 5GC 110 by means of the NG-C interface and to a User Plane Function (UPF) 135 (e.g., UPF 135A, UPF 135B) of the 5GC 110 by means of the NG-U interface. The transport network layer of the NG-U interface may be built on IP transport and GTP protocol may be used on top of UDP/IP to carry the user plane PDUs between the NG-RAN node (e.g., gNB 115 or ng-eNB 120) and the UPF 135. NG-U may provide non-guaranteed delivery of user plane PDUs between the NG-RAN node and the UPF. The transport network layer of the NG-C interface may be built on IP transport. For the reliable transport of signaling messages, SCTP may be added on top of IP. The application layer signaling protocol may be referred to as NGAP (NG Application Protocol). The SCTP layer may provide guaranteed delivery of application layer messages. In the transport, IP layer point-to-point transmission may be used to deliver the signaling PDUs. The NG-C interface may provide the following functions: NG interface management; UE context management; UE mobility management; transport of NAS messages; paging; PDU Session Management; configuration transfer; and warning message transmission.

The gNB 115 or the ng-eNB 120 may host one or more of the following functions: Radio Resource Management functions such as Radio Bearer Control, Radio Admission Control, Connection Mobility Control, Dynamic allocation of resources to UEs in both uplink and downlink (e.g., scheduling); IP and Ethernet header compression, encryption and integrity protection of data; Selection of an AMF at UE attachment when no routing to an AMF can be determined from the information provided by the UE; Routing of User Plane data towards UPF(s); Routing of Control Plane information towards AMF; Connection setup and release; Scheduling and transmission of paging messages; Scheduling and transmission of system broadcast information (e.g., originated from the AMF); Measurement and measurement reporting configuration for mobility and scheduling; Transport level packet marking in the uplink; Session Management; Support of Network Slicing; QoS Flow management and mapping to data radio bearers; Support of UEs in RRC Inactive state; Distribution function for NAS messages; Radio access network sharing; Dual Connectivity; Tight interworking between NR and E-UTRA; and Maintaining security and radio configuration for User Plane 5G system (5GS) Cellular IoT (CIoT) Optimization.

The AMF 130 may host one or more of the following functions: NAS signaling termination; NAS signaling security; AS Security control; Inter CN node signaling for mobility between 3GPP access networks; Idle mode UE Reachability (including control and execution of paging retransmission); Registration Area management; Support of intra-system and inter-system mobility; Access Authentication; Access Authorization including check of roaming rights; Mobility management control (subscription and policies); Support of Network Slicing; Session Management Function (SMF) selection; Selection of 5GS CIoT optimizations.

The UPF 135 may host one or more of the following functions: Anchor point for Intra-/Inter-RAT mobility (when applicable); External PDU session point of interconnect to Data Network; Packet routing and forwarding; Packet inspection and User plane part of Policy rule enforcement; Traffic usage reporting; Uplink classifier to support routing traffic flows to a data network; Branching point to support multihomed PDU session; QoS handling for user plane, e.g. packet filtering, gating, UL/DL rate enforcement; Uplink Traffic verification (Service Data Flow (SDF) to QoS flow mapping); Downlink packet buffering and downlink data notification triggering.

As shown in FIG. 1, the NG-RAN 105 may support the PC5 interface between two UEs 125 (e.g., UE 125A and UE 125B). In the PC5 interface, the direction of communications between two UEs (e.g., from UE 125A to UE 125B or vice versa) may be referred to as sidelink. Sidelink transmission and reception over the PC5 interface may be supported when the UE 125 is inside NG-RAN 105 coverage, irrespective of which RRC state the UE is in, and when the UE 125 is outside NG-RAN 105 coverage. Support of V2X services via the PC5 interface may be provided by NR sidelink communication and/or V2X sidelink communication.

PC5-S signaling may be used for unicast link establishment with Direct Communication Request/Accept message. A UE may self-assign its source Layer-2 ID for the PC5 unicast link for example based on the V2X service type. During unicast link establishment procedure, the UE may send its source Layer-2 ID for the PC5 unicast link to the peer UE, e.g., the UE for which a destination ID has been received from the upper layers. A pair of source Layer-2 ID and destination Layer-2 ID may uniquely identify a unicast link. The receiving UE may verify that the said destination ID belongs to it and may accept the Unicast link establishment request from the source UE. During the PC5 unicast link establishment procedure, a PC5-RRC procedure on the Access Stratum may be invoked for the purpose of UE sidelink context establishment as well as for AS layer configurations, capability exchange etc. PC5-RRC signaling may enable exchanging UE capabilities and AS layer configurations such as Sidelink Radio Bearer configurations between pair of UEs for which a PC5 unicast link is established.

NR sidelink communication may support one of three types of transmission modes (e.g., Unicast transmission, Groupcast transmission, and Broadcast transmission) for a pair of a Source Layer-2 ID and a Destination Layer-2 ID in the AS. The Unicast transmission mode may be characterized by: Support of one PC5-RRC connection between peer UEs for the pair; Transmission and reception of control information and user traffic between peer UEs in sidelink; Support of sidelink HARQ feedback; Support of sidelink transmit power control; Support of RLC Acknowledged Mode (AM); and Detection of radio link failure for the PC5-RRC connection. The Groupcast transmission may be characterized by: Transmission and reception of user traffic among UEs belonging to a group in sidelink; and Support of sidelink HARQ feedback. The Broadcast transmission may be characterized by: Transmission and reception of user traffic among UEs in sidelink.

A Source Layer-2 ID, a Destination Layer-2 ID and a PC5 Link Identifier may be used for NR sidelink communication. The Source Layer-2 ID may be a link-layer identity that identifies a device or a group of devices that are recipients of sidelink communication frames. The Destination Layer-2 ID may be a link-layer identity that identifies a device that originates sidelink communication frames. In some examples, the Source Layer-2 ID and the Destination Layer-2 ID may be assigned by a management function in the Core Network. The Source Layer-2 ID may identify the sender of the data in NR sidelink communication. The Source Layer-2 ID may be 24 bits long and may be split in the medium access control (MAC) layer into two-bit strings: One bit string may be the LSB part (8 bits) of Source Layer-2 ID and forwarded to physical layer of the sender. This may identify the source of the intended data in sidelink control information and may be used for filtering of packets at the physical layer of the receiver; and the Second bit string may be the MSB part (16 bits) of the Source Layer-2 ID and may be carried within the MAC header. This may be used for filtering of packets at the MAC layer of the receiver. The Destination Layer-2 ID may identify the target of the data in NR sidelink communication. For NR sidelink communication, the Destination Layer-2 ID may be 24 bits long and may be split in the MAC layer into two-bit strings: One bit string may be the LSB part (16 bits) of Destination Layer-2 ID and forwarded to physical layer of the sender. This may identify the target of the intended data in sidelink control information and may be used for filtering of packets at the physical layer of the receiver; and the Second bit string may be the MSB part (8 bits) of the Destination Layer-2 ID and may be carried within the MAC header. This may be used for filtering of packets at the MAC layer of the receiver. The PC5 Link Identifier may uniquely identify the PC5 unicast link in a UE for the lifetime of the PC5 unicast link. The PC5 Link Identifier may be used to indicate the PC5 unicast link whose sidelink Radio Link failure (RLF) declaration was made and PC5-RRC connection was released.

Figure 2A:
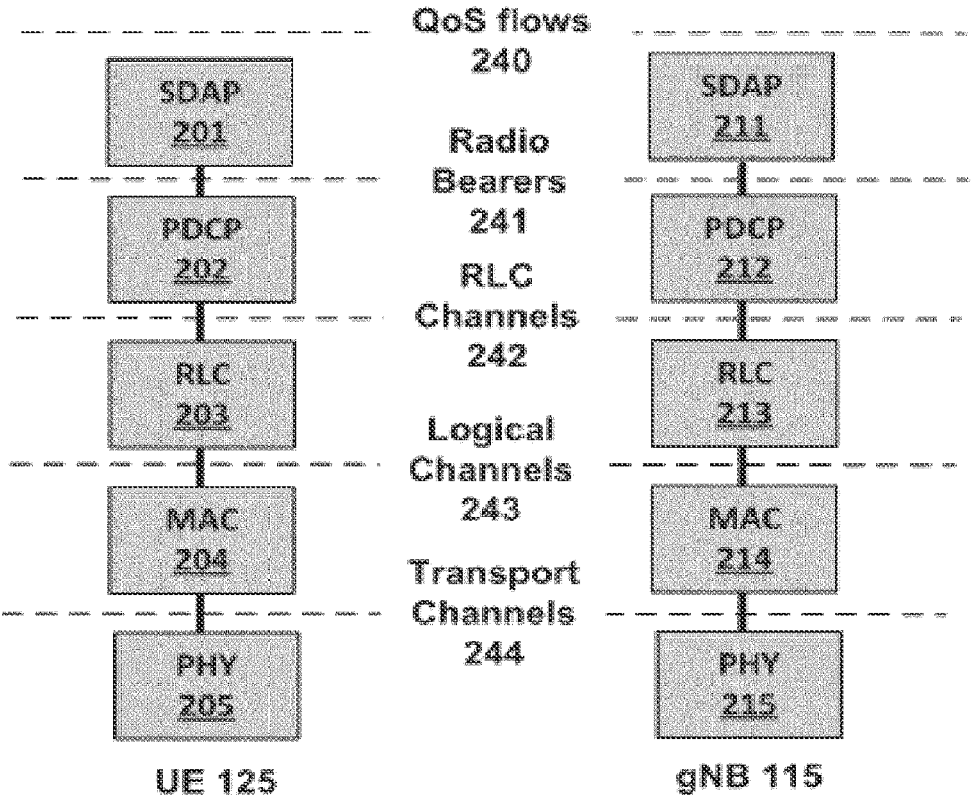
FIG. 2A and FIG. 2B show examples of radio protocol stacks for user plane and control plane, respectively, according to some aspects of one or more exemplary embodiments of the present disclosure.
Figure 2B:
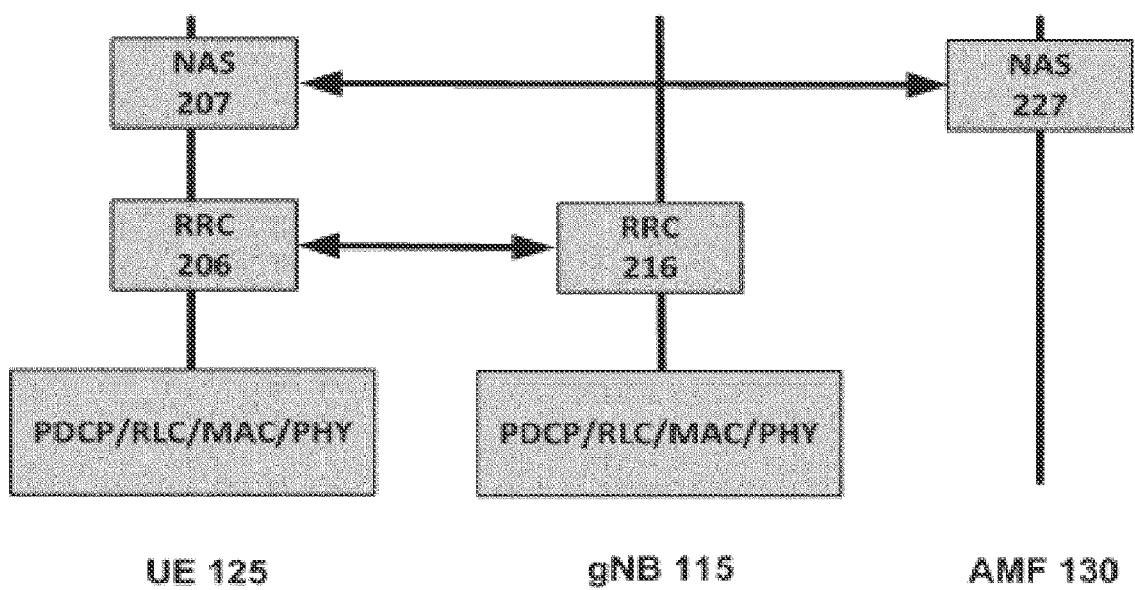

FIG. 2A and FIG. 2B show examples of radio protocol stacks for user plane and control plane, respectively, according to some aspects of one or more exemplary embodiments of the present disclosure. As shown in FIG. 2A, the protocol stack for the user plane of the Uu interface (between the UE 125 and the gNB 115) includes Service Data Adaptation Protocol (SDAP) 201 and SDAP 211, Packet Data Convergence Protocol (PDCP) 202 and PDCP 212, Radio Link Control (RLC) 203 and RLC 213, MAC 204 and MAC 214 sublayers of layer 2 and Physical (PHY) 205 and PHY 215 layer (layer 1 also referred to as L1).

The PHY 205 and PHY 215 offer transport channels 244 to the MAC 204 and MAC 214 sublayer. The MAC 204 and MAC 214 sublayer offer logical channels 243 to the RLC 203 and RLC 213 sublayer. The RLC 203 and RLC 213 sublayer offer RLC channels 242 to the PDCP 202 and PCP 212 sublayer. The PDCP 202 and PDCP 212 sublayer offer radio bearers 241 to the SDAP 201 and SDAP 211 sublayer. Radio bearers may be categorized into two groups: Data Radio Bearers (DRBs) for user plane data and Signaling Radio Bearers (SRBs) for control plane data. The SDAP 201 and SDAP 211 sublayer offers QoS flows 240 to 5GC.

The main services and functions of the MAC 204 or MAC 214 sublayer include: mapping between logical channels and transport channels; Multiplexing/demultiplexing of MAC Service Data Units (SDUs) belonging to one or different logical channels into/from Transport Blocks (TB) delivered to/from the physical layer on transport channels; Scheduling information reporting; Error correction through Hybrid Automatic Repeat Request (HARQ) (one HARQ entity per cell in case of carrier aggregation (CA)); Priority handling between UEs by means of dynamic scheduling; Priority handling between logical channels of one UE by means of Logical Channel Prioritization (LCP); Priority handling between overlapping resources of one UE; and Padding. A single MAC entity may support multiple numerologies, transmission timings and cells. Mapping restrictions in logical channel prioritization control which numerology (ies), cell(s), and transmission timing(s) a logical channel may use.

The HARQ functionality may ensure delivery between peer entities at Layer 1. A single HARQ process may support one TB when the physical layer is not configured for downlink/uplink spatial multiplexing, and when the physical layer is configured for downlink/uplink spatial multiplexing, a single HARQ process may support one or multiple TB s.

The RLC 203 or RLC 213 sublayer may support three transmission modes: Transparent Mode (TM); Unacknowledged Mode (UM); and Acknowledged Mode (AM). The RLC configuration may be per logical channel with no dependency on numerologies and/or transmission durations, and Automatic Repeat Request (ARQ) may operate on any of the numerologies and/or transmission durations the logical channel is configured with.

The main services and functions of the RLC 203 or RLC 213 sublayer depend on the transmission mode (e.g., TM, UM or AM) and may include: Transfer of upper layer PDUs; Sequence numbering independent of the one in PDCP (UM and AM); Error Correction through ARQ (AM only); Segmentation (AM and UM) and resegmentation (AM only) of RLC SDUs; Reassembly of SDU (AM and UM); Duplicate Detection (AM only); RLC SDU discard (AM and UM); RLC re-establishment; and Protocol error detection (AM only).

The automatic repeat request within the RLC 203 or RLC 213 sublayer may have the following characteristics: ARQ retransmits RLC SDUs or RLC SDU segments based on RLC status reports; Polling for RLC status report may be used when needed by RLC; RLC receiver may also trigger RLC status report after detecting a missing RLC SDU or RLC SDU segment.

The main services and functions of the PDCP 202 or PDCP 212 sublayer may include: Transfer of data (user plane or control plane); Maintenance of PDCP Sequence Numbers (SNs); Header compression and decompression using the Robust Header Compression (ROHC) protocol; Header compression and decompression using EHC protocol; Ciphering and deciphering; Integrity protection and integrity verification; Timer based SDU discard; Routing for split bearers; Duplication; Reordering and in-order delivery; Out-of-order delivery; and Duplicate discarding.

The main services and functions of SDAP 201 or SDAP 211 include: Mapping between a QoS flow and a data radio bearer; and Marking QoS Flow ID (QFI) in both downlink and uplink packets. A single protocol entity of SDAP may be configured for each individual PDU session.

As shown in FIG. 2B, the protocol stack of the control plane of the Uu interface (between the UE 125 and the gNB 115) includes PHY layer (layer 1), and MAC, RLC and PDCP sublayers of layer 2 as described above and in addition, the RRC 206 sublayer and RRC 216 sublayer. The main services and functions of the RRC 206 sublayer and the RRC 216 sublayer over the Uu interface include: Broadcast of System Information related to AS and NAS; Paging initiated by 5GC or NG-RAN; Establishment, maintenance and release of an RRC connection between the UE and NG-RAN (including Addition, modification and release of carrier aggregation; and Addition, modification and release of Dual Connectivity in NR or between E-UTRA and NR); Security functions including key management; Establishment, configuration, maintenance and release of SRBs and DRBs; Mobility functions (including Handover and context transfer; UE cell selection and reselection and control of cell selection and reselection; and Inter-RAT mobility); QoS management functions; UE measurement reporting and control of the reporting; Detection of and recovery from radio link failure; and NAS message transfer to/from NAS from/to UE. The NAS 207 and NAS 227 layer is a control protocol (terminated in AMF on the network side) that performs the functions such as authentication, mobility management, security control, etc.

The sidelink specific services and functions of the RRC sublayer over the Uu interface include: Configuration of sidelink resource allocation via system information or dedicated signaling; Reporting of UE sidelink information; Measurement configuration and reporting related to sidelink; and Reporting of UE assistance information for SL traffic pattern(s).

FIG. 3A, FIG. 3B and FIG. 3C show example mappings between logical channels and transport channels in downlink, uplink and sidelink, respectively, according to some aspects of one or more exemplary embodiments of the present disclosure. Different kinds of data transfer services may be offered by MAC. Each logical channel type may be defined by what type of information is transferred. Logical channels may be classified into two groups: Control Channels and Traffic Channels. Control channels may be used for the transfer of control plane information only. The Broadcast Control Channel (BCCH) is a downlink channel for broadcasting system control information. The Paging Control Channel (PCCH) is a downlink channel that carries paging messages. The Common Control Channel (CCCH) is channel for transmitting control information between UEs and network. This channel may be used for UEs having no RRC connection with the network. The Dedicated Control Channel (DCCH) is a point-to-point bi-directional channel that transmits dedicated control information between a UE and the network and may be used by UEs having an RRC connection. Traffic channels may be used for the transfer of user plane information only. The Dedicated Traffic Channel (DTCH) is a point-to-point channel, dedicated to one UE, for the transfer of user information. A DTCH may exist in both uplink and downlink. Sidelink Control Channel (SCCH) is a sidelink channel for transmitting control information (e.g., PC5-RRC and PC5-S messages) from one UE to other UE(s). Sidelink Traffic Channel (STCH) is a sidelink channel for transmitting user information from one UE to other UE(s). Sidelink Broadcast Control Channel (SBCCH) is a sidelink channel for broadcasting sidelink system information from one UE to other UE(s).

The downlink transport channel types include Broadcast Channel (BCH), Downlink Shared Channel (DL-SCH), and Paging Channel (PCH). The BCH may be characterized by: fixed, pre-defined transport format; and requirement to be broadcast in the entire coverage area of the cell, either as a single message or by beamforming different BCH instances. The DL-SCH may be characterized by: support for HARQ; support for dynamic link adaptation by varying the modulation, coding and transmit power; possibility to be broadcast in the entire cell; possibility to use beamforming; support for both dynamic and semi-static resource allocation; and the support for UE Discontinuous Reception (DRX) to enable UE power saving. The DL-SCH may be characterized by: support for HARQ; support for dynamic link adaptation by varying the modulation, coding and transmit power; possibility to be broadcast in the entire cell; possibility to use beamforming; support for both dynamic and semi-static resource allocation; support for UE discontinuous reception (DRX) to enable UE power saving. The PCH may be characterized by: support for UE discontinuous reception (DRX) to enable UE power saving (DRX cycle is indicated by the network to the UE); requirement to be broadcast in the entire coverage area of the cell, either as a single message or by beamforming different BCH instances; mapped to physical resources which can be used dynamically also for traffic/other control channels.

In downlink, the following connections between logical channels and transport channels may exist: BCCH may be mapped to BCH; BCCH may be mapped to DL-SCH; PCCH may be mapped to PCH; CCCH may be mapped to DL-SCH; DCCH may be mapped to DL-SCH; and DTCH may be mapped to DL-SCH.

The uplink transport channel types include Uplink Shared Channel (UL-SCH) and Random Access Channel(s) (RACH). The UL-SCH may be characterized by possibility to use beamforming; support for dynamic link adaptation by varying the transmit power and potentially modulation and coding; support for HARQ; support for both dynamic and semi-static resource allocation. The RACH may be characterized by limited control information; and collision risk.

In Uplink, the following connections between logical channels and transport channels may exist: CCCH may be mapped to UL-SCH; DCCH may be mapped to UL-SCH; and DTCH may be mapped to UL-SCH.

The sidelink transport channel types include: Sidelink broadcast channel (SL-BCH) and Sidelink shared channel (SL-SCH). The SL-BCH may be characterized by predefined transport format. The SL-SCH may be characterized by support for unicast transmission, groupcast transmission and broadcast transmission; support for both UE autonomous resource selection and scheduled resource allocation by NG-RAN; support for both dynamic and semi-static resource allocation when UE is allocated resources by the NG-RAN; support for HARQ; and support for dynamic link adaptation by varying the transmit power, modulation and coding.

In the sidelink, the following connections between logical channels and transport channels may exist: SCCH may be mapped to SL-SCH; STCH may be mapped to SL-SCH; and SBCCH may be mapped to SL-BCH.

Figures 4A, 4B, 4C:
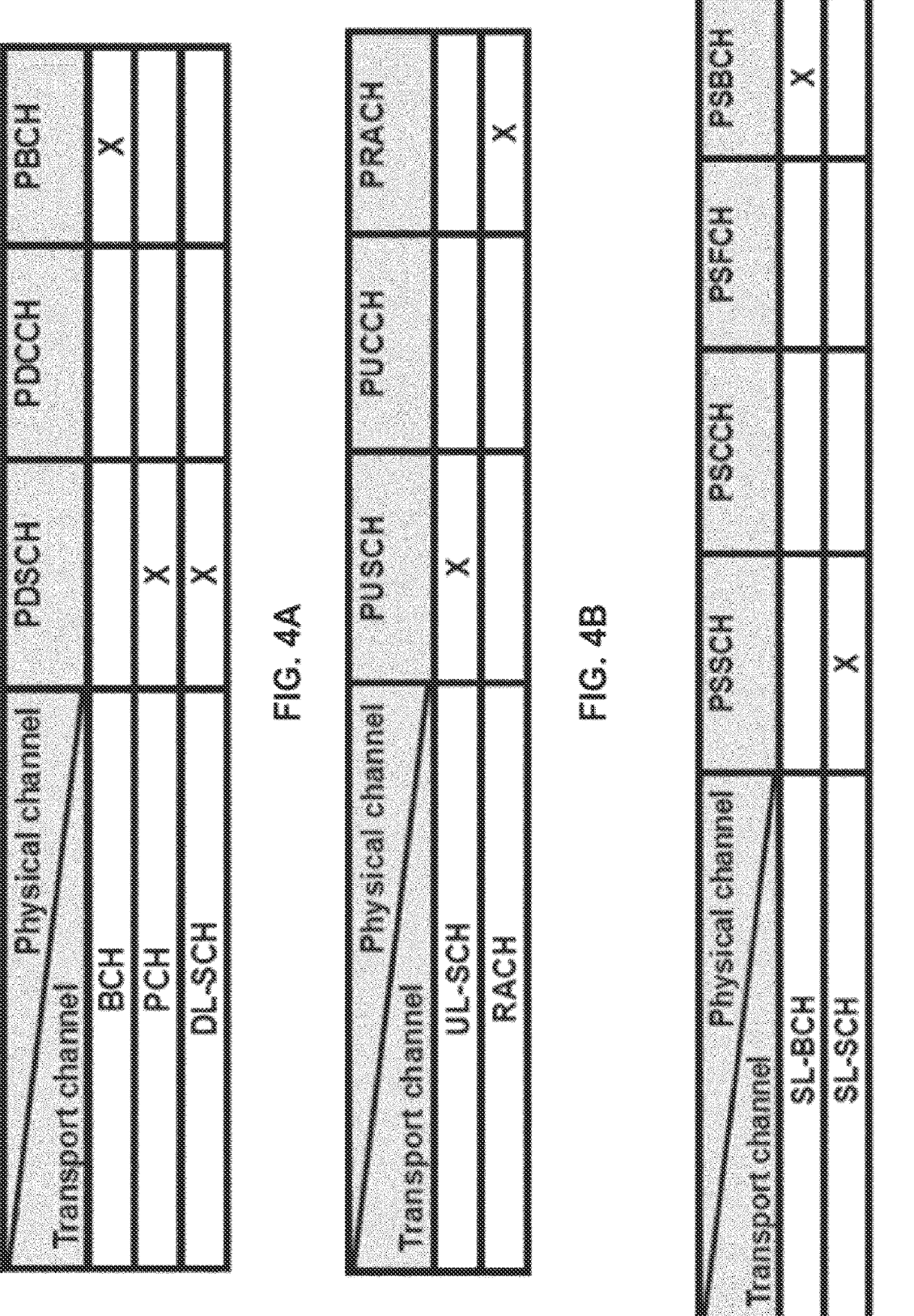
FIG. 4A, FIG. 4B and FIG. 4C show example mappings between transport channels and physical channels in downlink, uplink and sidelink, respectively, according to some aspects of one or more exemplary embodiments of the present disclosure.

FIG. 4A, FIG. 4B and FIG. 4C show example mappings between transport channels and physical channels in downlink, uplink and sidelink, respectively, according to some aspects of one or more exemplary embodiments of the present disclosure. The physical channels in downlink include Physical Downlink Shared Channel (PDSCH), Physical Downlink Control Channel (PDCCH) and Physical Broadcast Channel (PBCH). The PCH and DL-SCH transport channels are mapped to the PDSCH. The BCH transport channel is mapped to the PBCH. A transport channel is not mapped to the PDCCH but Downlink Control Information (DCI) is transmitted via the PDCCH.

The physical channels in the uplink include Physical Uplink Shared Channel (PUSCH), Physical Uplink Control Channel (PUCCH) and Physical Random Access Channel (PRACH). The UL-SCH transport channel may be mapped to the PUSCH and the RACH transport channel may be mapped to the PRACH. A transport channel is not mapped to the PUCCH but Uplink Control Information (UCI) is transmitted via the PUCCH.

The physical channels in the sidelink include Physical Sidelink Shared Channel (PSSCH), Physical Sidelink Control Channel (PSCCH), Physical Sidelink Feedback Channel (PSFCH) and Physical Sidelink Broadcast Channel (PSBCH). The Physical Sidelink Control Channel (PSCCH) may indicate resource and other transmission parameters used by a UE for PSSCH. The Physical Sidelink Shared Channel (PSSCH) may transmit the TBs of data themselves, and control information for HARQ procedures and Channel State Information (CSI) feedback triggers, etc. At least six Orthogonal Frequency Division Multiplexing (OFDM) symbols within a slot may be used for PSSCH transmission. Physical Sidelink Feedback Channel (PSFCH) may carry the HARQ feedback over the sidelink from a UE which is an intended recipient of a PSSCH transmission to the UE which performed the transmission. PSFCH sequence may be transmitted in one PRB repeated over two OFDM symbols near the end of the sidelink resource in a slot. The SL-SCH transport channel may be mapped to the PSSCH. The SL-BCH may be mapped to PSBCH. No transport channel is mapped to the PSFCH but Sidelink Feedback Control Information (SFCI) may be mapped to the PSFCH. No transport channel is mapped to PSCCH but Sidelink Control Information (SCI) may be mapped to the PSCCH.

Figures 5A, 5B, 5C, 5D:
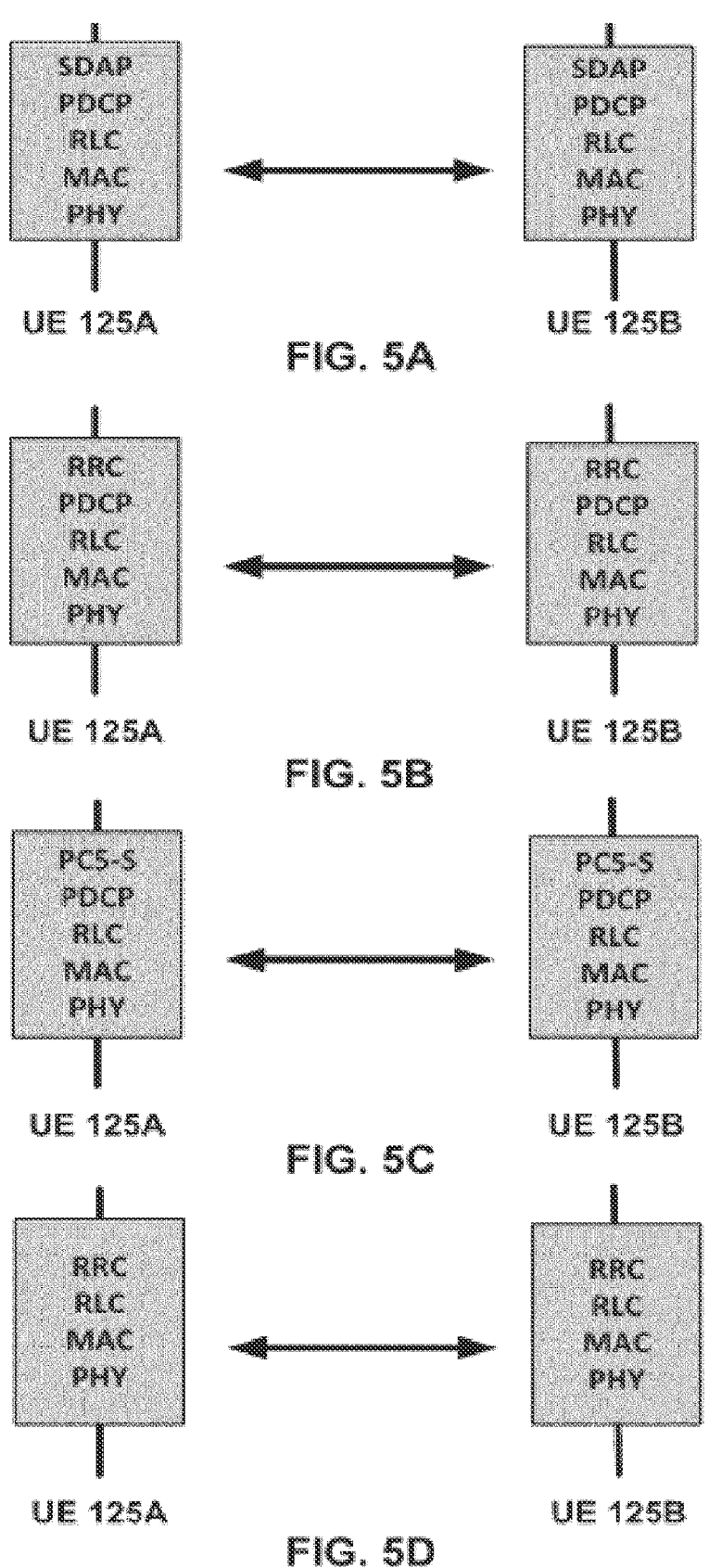
FIG. 5A, FIG. 5B, FIG. 5C and FIG. 5D show examples of radio protocol stacks for NR sidelink communication according to some aspects of one or more exemplary embodiments of the present disclosure.

FIG. 5A, FIG. 5B, FIG. 5C and FIG. 5D show examples of radio protocol stacks for NR sidelink communication according to some aspects of one or more exemplary embodiments of the present disclosure. The AS protocol stack for user plane in the PC5 interface (i.e., for STCH) may consist of SDAP, PDCP, RLC and MAC sublayers, and the physical layer. The protocol stack of user plane is shown in FIG. 5A. The AS protocol stack for SBCCH in the PC5 interface may consist of RRC, RLC, MAC sublayers, and the physical layer as shown below in FIG. 5B. For support of PC5-S protocol, PC5-S is located on top of PDCP, RLC and MAC sublayers, and the physical layer in the control plane protocol stack for SCCH for PC5-S, as shown in FIG. 5C. The AS protocol stack for the control plane for SCCH for RRC in the PC5 interface consists of RRC, PDCP, RLC and MAC sublayers, and the physical layer. The protocol stack of control plane for SCCH for RRC is shown in FIG. 5D.

The Sidelink Radio Bearers (SLRBs) may be categorized into two groups: Sidelink Data Radio Bearers (SL DRB) for user plane data and Sidelink Signaling Radio Bearers (SL SRB) for control plane data. Separate SL SRBs using different SCCHs may be configured for PC5-RRC and PC5-S signaling, respectively.

The MAC sublayer may provide the following services and functions over the PC5 interface: Radio resource selection; Packet filtering; Priority handling between uplink and sidelink transmissions for a given UE; and Sidelink CSI reporting. With logical channel prioritization restrictions in MAC, only sidelink logical channels belonging to the same destination may be multiplexed into a MAC PDU for every unicast, groupcast and broadcast transmission which may be associated to the destination. For packet filtering, a SL-SCH MAC header including portions of both Source Layer-2 ID and a Destination Layer-2 ID may be added to a MAC PDU. The Logical Channel Identifier (LCID) included within a MAC subheader may uniquely identify a logical channel within the scope of the Source Layer-2 ID and Destination Layer-2 ID combination.

The services and functions of the RLC sublayer may be supported for sidelink. Both RLC Unacknowledged Mode (UM) and Acknowledged Mode (AM) may be used in unicast transmission while only UM may be used in groupcast or broadcast transmission. For UM, only unidirectional transmission may be supported for groupcast and broadcast.

The services and functions of the PDCP sublayer for the Uu interface may be supported for sidelink with some restrictions: Out-of-order delivery may be supported only for unicast transmission; and Duplication may not be supported over the PC5 interface.

The SDAP sublayer may provide the following service and function over the PC5 interface: Mapping between a QoS flow and a sidelink data radio bearer. There may be one SDAP entity per destination for one of unicast, groupcast and broadcast which is associated to the destination.

The RRC sublayer may provide the following services and functions over the PC5 interface: Transfer of a PC5-RRC message between peer UEs; Maintenance and release of a PC5-RRC connection between two UEs; and Detection of sidelink radio link failure for a PC5-RRC connection based on indication from MAC or RLC. A PC5-RRC connection may be a logical connection between two UEs for a pair of Source and Destination Layer-2 IDs which may be considered to be established after a corresponding PC5 unicast link is established. There may be one-to-one correspondence between the PC5-RRC connection and the PC5 unicast link. A UE may have multiple PC5-RRC connections with one or more UEs for different pairs of Source and Destination Layer-2 IDs. Separate PC5-RRC procedures and messages may be used for a UE to transfer UE capability and sidelink configuration including SL-DRB configuration to the peer UE. Both peer UEs may exchange their own UE capability and sidelink configuration using separate bi-directional procedures in both sidelink directions.

FIG. 6 shows example physical signals in downlink, uplink and sidelink according to some aspects of one or more exemplary embodiments of the present disclosure. The Demodulation Reference Signal (DM-RS) may be used in downlink, uplink and sidelink and may be used for channel estimation. DM-RS is a UE-specific reference signal and may be transmitted together with a physical channel in downlink, uplink or sidelink and may be used for channel estimation and coherent detection of the physical channel. The Phase Tracking Reference Signal (PT-RS) may be used in downlink, uplink and sidelink and may be used for tracking the phase and mitigating the performance loss due to phase noise. The PT-RS may be used mainly to estimate and minimize the effect of Common Phase Error (CPE) on system performance. Due to the phase noise properties, PT-RS signal may have a low density in the frequency domain and a high density in the time domain. PT-RS may occur in combination with DM-RS and when the network has configured PT-RS to be present. The Positioning Reference Signal (PRS) may be used in downlink for positioning using different positioning techniques. PRS may be used to measure the delays of the downlink transmissions by correlating the received signal from the base station with a local replica in the receiver. The Channel State Information Reference Signal (CSI-RS) may be used in downlink and sidelink. CSI-RS may be used for channel state estimation, Reference Signal Received Power (RSRP) measurement for mobility and beam management, time/frequency tracking for demodulation among other uses. CSI-RS may be configured UE-specifically but multiple users may share the same CSI-RS resource. The UE may determine CSI reports and transit them in the uplink to the base station using PUCCH or PUSCH. The CSI report may be carried in a sidelink MAC control element (CE). The Primary Synchronization Signal (PSS) and the Secondary Synchronization Signal (SSS) may be used for radio fame synchronization. The PSS and SSS may be used for the cell search procedure during the initial attach or for mobility purposes. The Sounding Reference Signal (SRS) may be used in uplink for uplink channel estimation. Similar to CSI-RS, the SRS may serve as QCL reference for other physical channels such that they can be configured and transmitted quasi-collocated with SRS. The Sidelink PSS (S-PSS) and Sidelink SSS (S-SSS) may be used in sidelink for sidelink synchronization.

Figure 7:
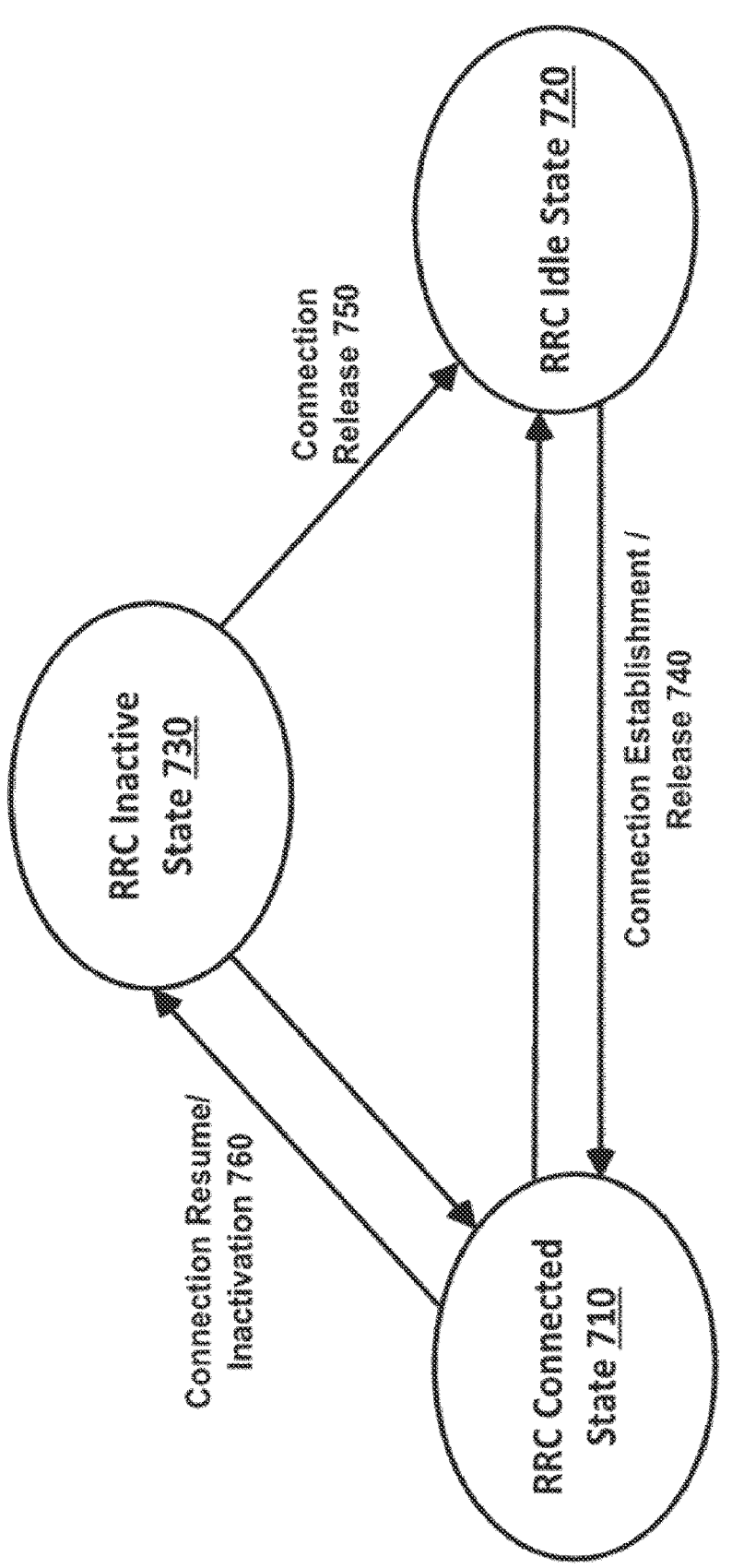
FIG. 7 shows examples of Radio Resource Control (RRC) states and transitioning between different RRC states according to some aspects of one or more exemplary embodiments of the present disclosure.

FIG. 7 shows examples of Radio Resource Control (RRC) states and transitioning between different RRC states according to some aspects of one or more exemplary embodiments of the present disclosure. A UE may be in one of three RRC states: RRC Connected State 710, RRC Idle State 720 and RRC Inactive state 730. After power up, the UE may be in RRC Idle state 720 and the UE may establish connection with the network using initial access and via an RRC connection establishment procedure to perform data transfer and/or to make/receive voice calls. Once RRC connection is established, the UE may be in RRC Connected State 710. The UE may transition from the RRC Idle state 720 to the RRC connected state 710 or from the RRC Connected State 710 to the RRC Idle state 720 using the RRC connection Establishment/Release procedures 740.

To reduce the signaling load and the latency resulting from frequent transitioning from the RRC Connected State 710 to the RRC Idle State 720 when the UE transmits frequent small data, the RRC Inactive State 730 may be used. In the RRC Inactive State 730, the AS context may be stored by both UE and gNB. This may result in faster state transition from the RRC Inactive State 730 to RRC Connected State 710. The UE may transition from the RRC Inactive State 730 to the RRC Connected State 710 or from the RRC Connected State 710 to the RRC Inactive State 730 using the RRC Connection Resume/Inactivation procedures 760. The UE may transition from the RRC Inactive State 730 to RRC Idle State 720 using an RRC Connection Release procedure 750.

Figure 8:
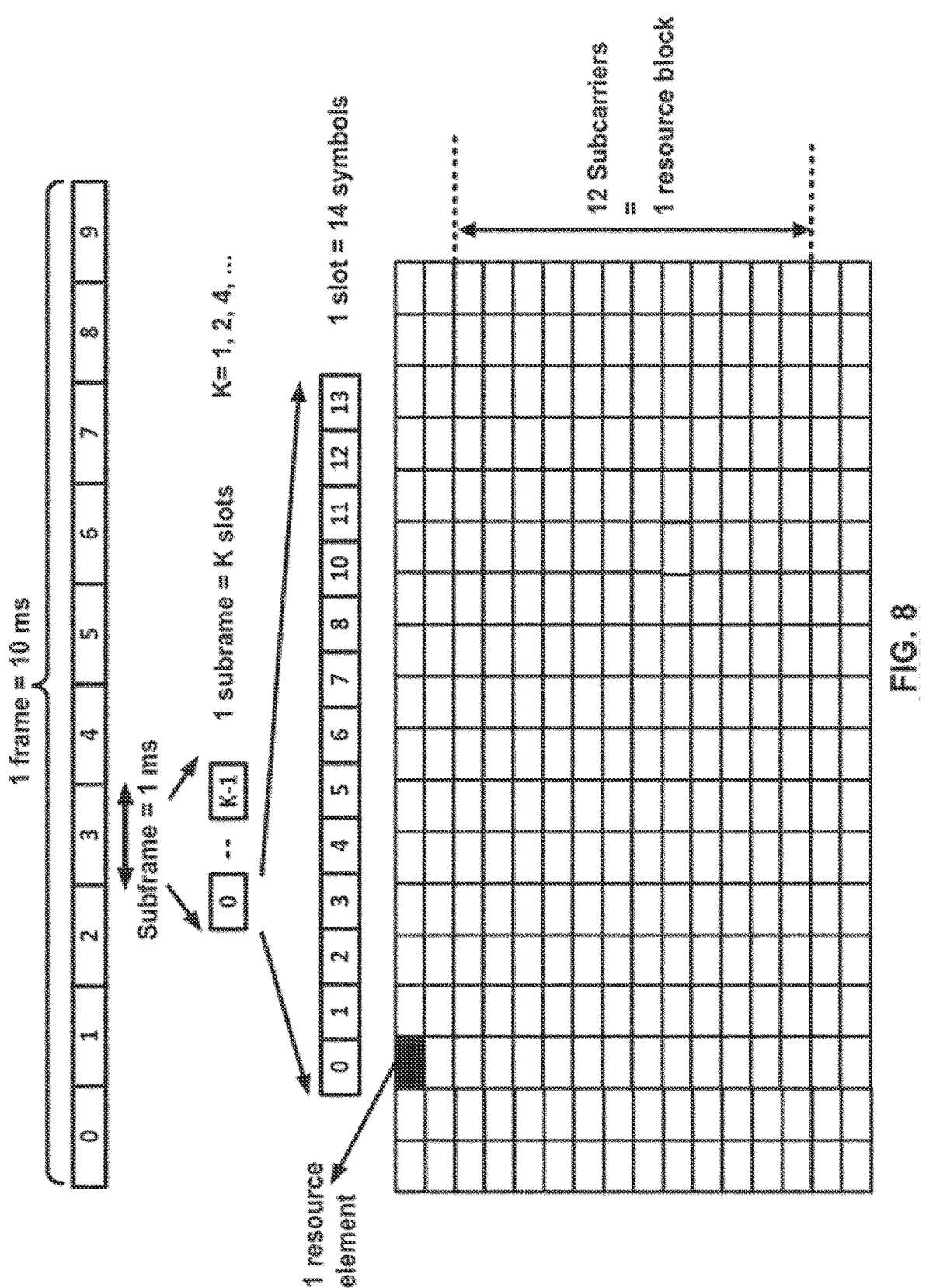
FIG. 8 shows example frame structure and physical resources according to some aspects of one or more exemplary embodiments of the present disclosure.

FIG. 8 shows example frame structure and physical resources according to some aspects of one or more exemplary embodiments of the present disclosure. The downlink or uplink or sidelink transmissions may be organized into frames with 10 ms duration, consisting of ten (0 to 9) 1 ms subframes. Each subframe may consist of k slots (k=1, 2, 4, . . . ), wherein the number of slots k per subframe may depend on the subcarrier spacing of the carrier on which the transmission takes place. The slot duration may be 14 (0 to 13) symbols with Normal Cyclic Prefix (CP) and 12 symbols with Extended CP and may scale in time as a function of the used sub-carrier spacing so that there is an integer number of slots in a subframe. FIG. 8 shows a resource grid in time and frequency domain. Each element of the resource grid, comprising one symbol in time and one subcarrier in frequency, is referred to as a Resource Element (RE). A Resource Block (RB) may be defined as 12 consecutive subcarriers in the frequency domain.

In some examples and with non-slot-based scheduling, the transmission of a packet may occur over a portion of a slot, for example, during two, four, or seven OFDM symbols which may also be referred to as mini-slots. The mini-slots may be used for low latency applications such as URLLC and operation in unlicensed bands. In some embodiments, the mini-slots may also be used for fast flexible scheduling of services (e.g., pre-emption of URLLC over eMBB).

Figure 9:
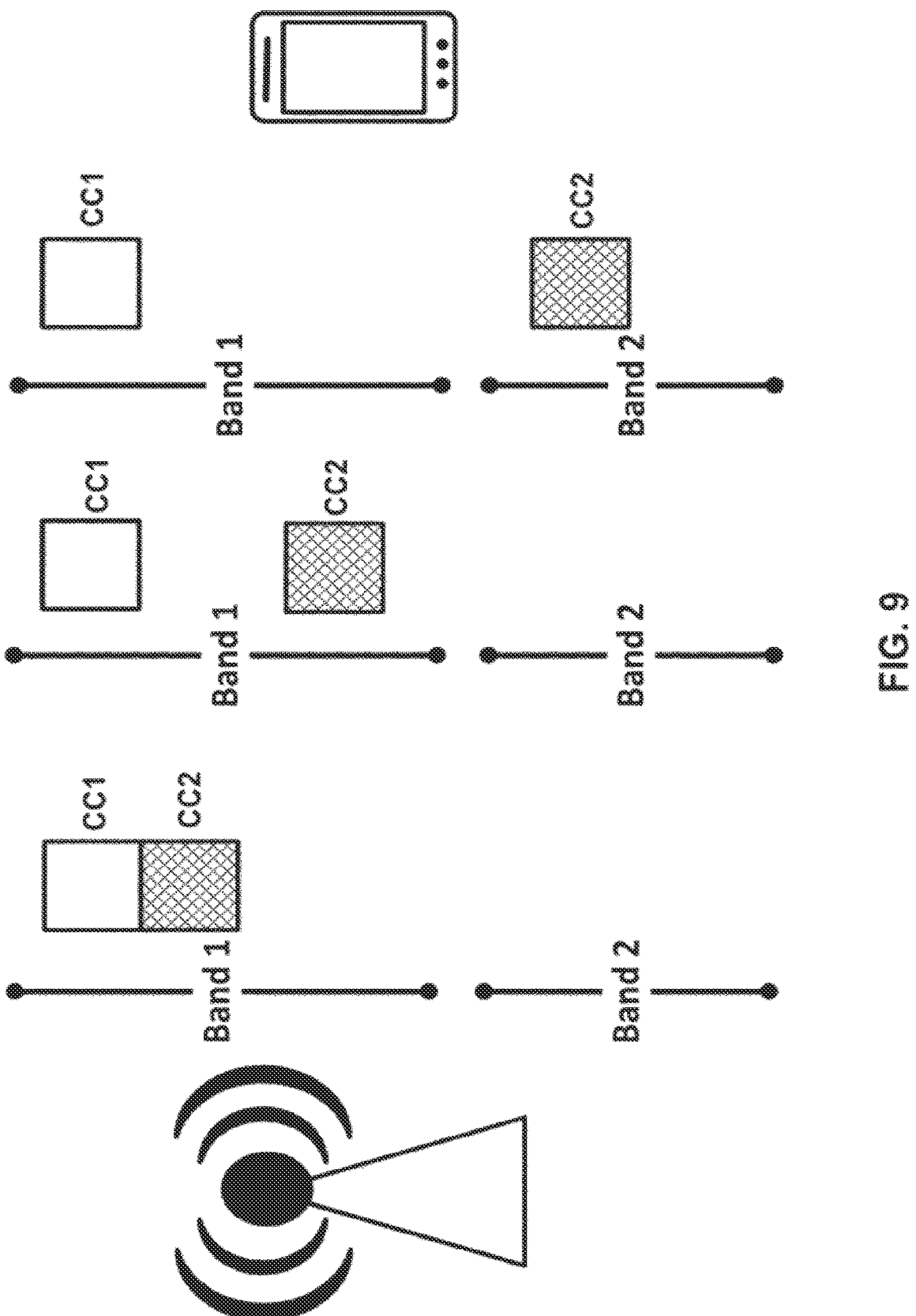
FIG. 9 shows example component carrier configurations in different carrier aggregation scenarios according to some aspects of one or more exemplary embodiments of the present disclosure.

FIG. 9 shows example component carrier configurations in different carrier aggregation scenarios according to some aspects of one or more exemplary embodiments of the present disclosure. In Carrier Aggregation (CA), two or more Component Carriers (CCs) may be aggregated. A UE may simultaneously receive or transmit on one or multiple CCs depending on its capabilities. CA may be supported for both contiguous and non-contiguous CCs in the same band or on different bands as shown in FIG. 9. A gNB and the UE may communicate using a serving cell. A serving cell may be associated at least with one downlink CC (e.g., may be associated only with one downlink CC or may be associated with a downlink CC and an uplink CC). A serving cell may be a Primary Cell (PCell) or a Secondary cCell (SCell).

A UE may adjust the timing of its uplink transmissions using an uplink timing control procedure. A Timing Advance (TA) may be used to adjust the uplink frame timing relative to the downlink frame timing. The gNB may determine the desired Timing Advance setting and provides that to the UE. The UE may use the provided TA to determine its uplink transmit timing relative to the UE's observed downlink receive timing.

In the RRC Connected state, the gNB may be responsible for maintaining the timing advance (TA) to keep the L1 synchronized. Serving cells having uplink to which the same TA applies and using the same timing reference cell are grouped in a Timing Advance Group (TAG). A TAG may contain at least one serving cell with configured uplink. The mapping of a serving cell to a TAG may be configured by RRC. For the primary TAG, the UE may use the PCell as timing reference cell, except with shared spectrum channel access where an SCell may also be used as timing reference cell in certain cases. In a secondary TAG, the UE may use any of the activated SCells of this TAG as a timing reference cell and may not change it unless necessary.

Timing advance updates may be signaled by the gNB to the UE via MAC CE commands. Such commands may restart a TAG-specific timer which may indicate whether the L1 can be synchronized or not: when the timer is running, the L1 may be considered synchronized, otherwise, the L1 may be considered non-synchronized (in which case uplink transmission may only take place on PRACH).

A UE with single TA capability for CA may simultaneously receive and/or transmit on multiple CCs corresponding to multiple serving cells sharing the same TA (multiple serving cells grouped in one TAG). A UE with multiple TA capability for CA may simultaneously receive and/or transmit on multiple CCs corresponding to multiple serving cells with different TAs (multiple serving cells grouped in multiple TAGs). The NG-RAN may ensure that each TAG contains at least one serving cell. A non-CA capable UE may receive on a single CC and may transmit on a single CC corresponding to one serving cell only (one serving cell in one TAG).

The multi-carrier nature of the physical layer in case of CA may be exposed to the MAC layer and one HARQ entity may be required per serving cell. When CA is configured, the UE may have one RRC connection with the network. At RRC connection establishment/re-establishment/handover, one serving cell (e.g., the PCell) may provide the NAS mobility information. Depending on UE capabilities, SCells may be configured to form together with the PCell a set of serving cells. The configured set of serving cells for a UE may consist of one PCell and one or more SCells. The reconfiguration, addition and removal of SCells may be performed by RRC.

In a dual connectivity scenario, a UE may be configured with a plurality of cells comprising a Master Cell Group (MCG) for communications with a master base station, a Secondary Cell Group (SCG) for communications with a secondary base station, and two MAC entities: one MAC entity and for the MCG for communications with the master base station and one MAC entity for the SCG for communications with the secondary base station.

Figure 10:
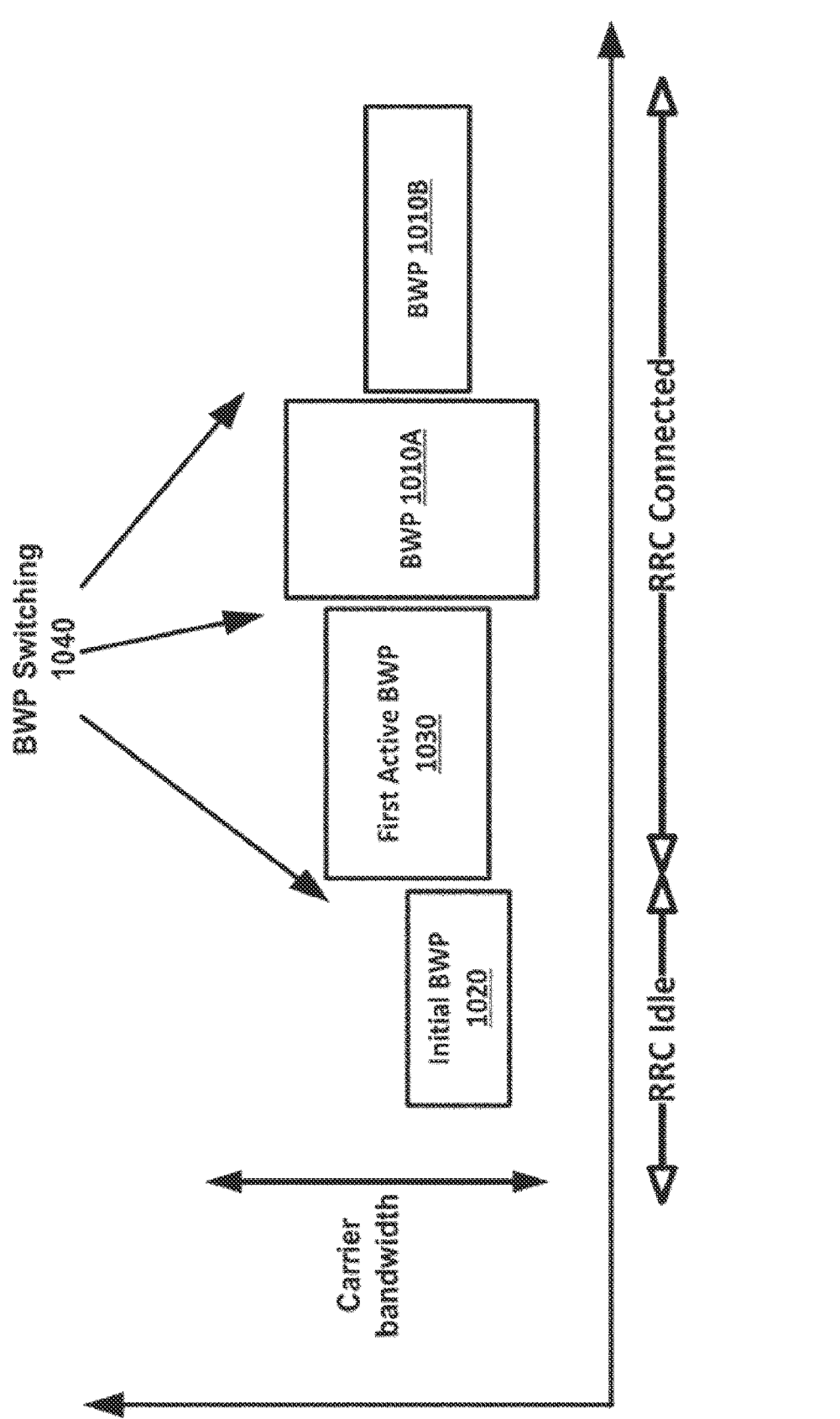
FIG. 10 shows example bandwidth part configuration and switching according to some aspects of one or more exemplary embodiments of the present disclosure.

FIG. 10 shows example bandwidth part configuration and switching according to some aspects of one or more exemplary embodiments of the present disclosure. The UE may be configured with one or more Bandwidth Parts (BWPs) 1010 (e.g., 1010A, 1010B) on a given component carrier. In some examples, one of the one or more bandwidth parts may be active at a time. The active bandwidth part may define the UE's operating bandwidth within the cell's operating bandwidth. For initial access, and until the UE's configuration in a cell is received, initial bandwidth part 1020 determined from system information may be used. With Bandwidth Adaptation (BA), for example, through BWP switching 1040, the receive and transmit bandwidth of a UE may not be as large as the bandwidth of the cell and may be adjusted. For example, the width may be ordered to change (e.g., to shrink during period of low activity to save power); the location may move in the frequency domain (e.g., to increase scheduling flexibility); and the subcarrier spacing may be ordered to change (e.g., to allow different services). The first active BWP 1030 may be the active BWP upon RRC (re-)configuration for a PCell or activation of an SCell.

For a downlink BWP or uplink BWP in a set of downlink BWPs or uplink BWPs, respectively, the UE may be provided the following configuration parameters: a Subcarrier Spacing (SCS); a cyclic prefix; a common RB and a number of contiguous RBs; an index in the set of downlink BWPs or uplink BWPs by respective BWP-Id; a set of BWP-common and a set of BWP-dedicated parameters. A BWP may be associated with an OFDM numerology according to the configured subcarrier spacing and cyclic prefix for the BWP. For a serving cell, a UE may be provided by a default downlink BWP among the configured downlink BWPs. If a UE is not provided a default downlink BWP, the default downlink BWP may be the initial downlink BWP.

A downlink BWP may be associated with a BWP inactivity timer. If the BWP inactivity timer associated with the active downlink BWP expires and if the default downlink BWP is configured, the UE may perform BWP switching to the default BWP. If the BWP inactivity timer associated with the active downlink BWP expires and if the default downlink BWP is not configured, the UE may perform BWP switching to the initial downlink BWP.

Figure 11:
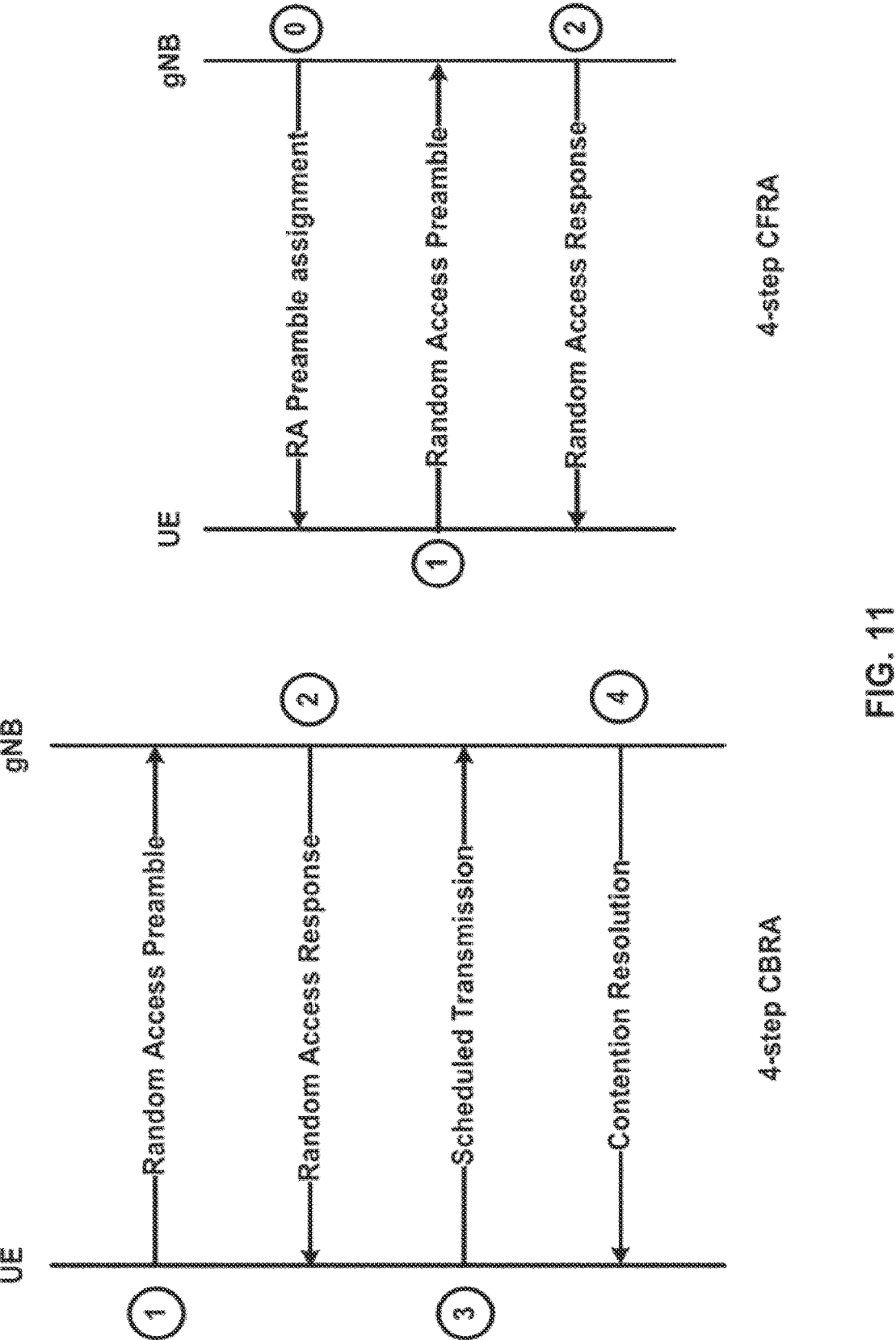
FIG. 11 shows example four-step contention-based and contention-free random access processes according to some aspects of one or more exemplary embodiments of the present disclosure.
Figure 12:
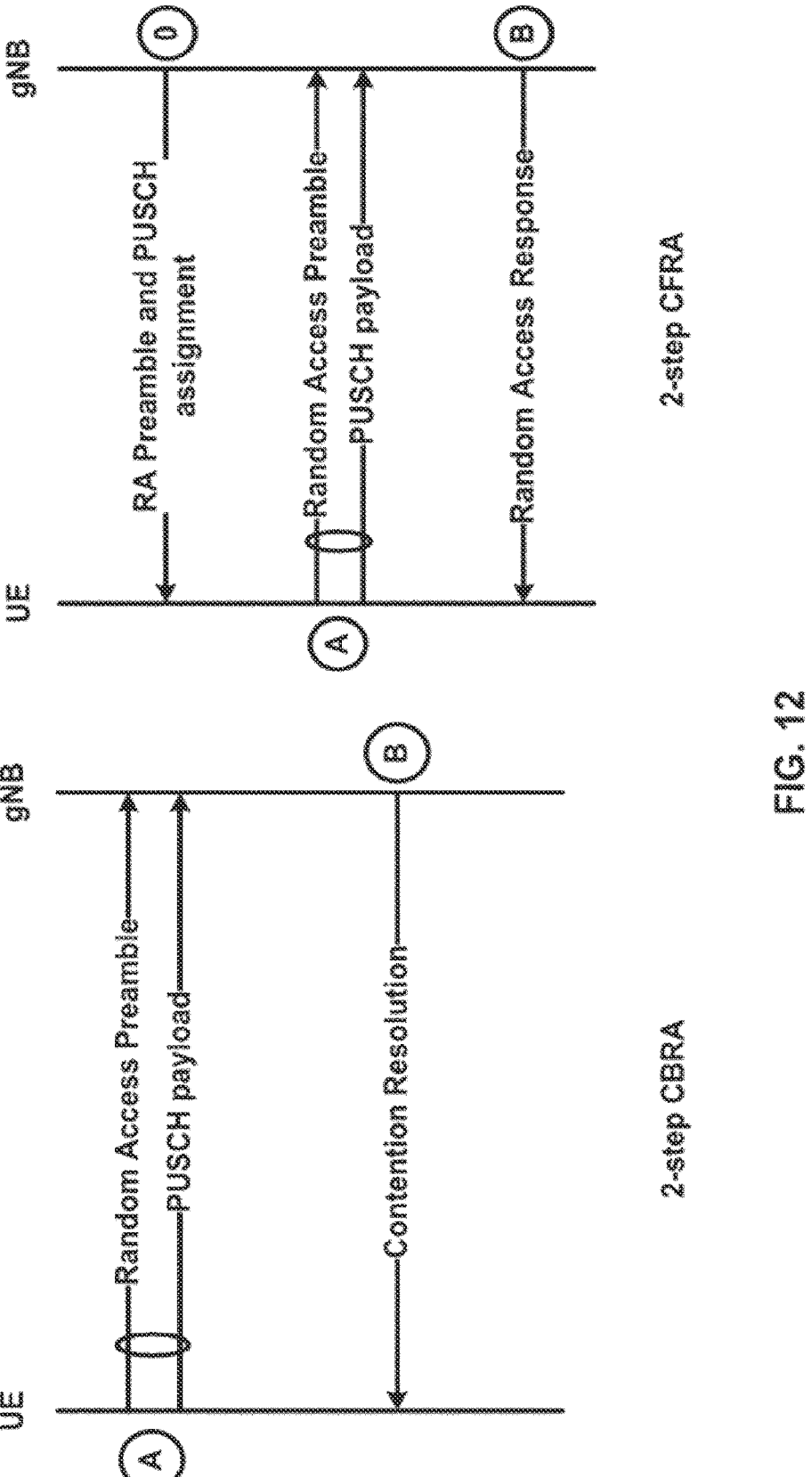
FIG. 12 shows example two-step contention-based and contention-free random access processes according to some aspects of one or more exemplary embodiments of the present disclosure.

FIG. 11 shows example four-step contention-based random access (CBRA) and contention-free random access (CFRA) processes according to some aspects of one or more exemplary embodiments of the present disclosure. FIG. 12 shows example two-step contention-based random access (CBRA) and contention-free random access (CFRA) processes according to some aspects of one or more exemplary embodiments of the present disclosure. The random access procedure may be triggered by a number of events, for example: Initial access from RRC Idle State; RRC Connection Re-establishment procedure; downlink or uplink data arrival during RRC Connected State when uplink synchronization status is "non-synchronized"; uplink data arrival during RRC Connected State when there are no PUCCH resources for Scheduling Request (SR) available; SR failure; Request by RRC upon synchronous reconfiguration (e.g., handover); Transition from RRC Inactive State; to establish time alignment for a secondary TAG; Request for Other System Information (SI); Beam Failure Recovery (BFR); Consistent uplink Listen-Before-Talk (LBT) failure on PCell.

Two types of Random Access (RA) procedure may be supported: 4-step RA type with MSG1 and 2-step RA type with MSGA. Both types of RA procedure may support Contention-Based Random Access (CBRA) and Contention-Free Random Access (CFRA) as shown in FIG. 11 and FIG. 12.

The UE may select the type of random access at initiation of the random access procedure based on network configuration. When CFRA resources are not configured, a RSRP threshold may be used by the UE to select between 2-step RA type and 4-step RA type. When CFRA resources for 4-step RA type are configured, UE may perform random access with 4-step RA type. When CFRA resources for 2-step RA type are configured, UE may perform random access with 2-step RA type.

The MSG1 of the 4-step RA type may consist of a preamble on PRACH (Step 1 of CBRA in FIG. 11). After MSG1 transmission, the UE may monitor for a response from the network within a configured window (Step 2 of CBRA in FIG. 11). For CFRA, dedicated preamble for MSG1 transmission may be assigned by the network (Step 0 of CFRA of FIG. 11) and upon receiving Random Access Response (RAR) from the network, the UE may end the random access procedure as shown in FIG. 11 (Steps 1 and 2 of CFRA in FIG. 11). For CBRA, upon reception of the random access response (Step 2 of CBRA in FIG. 11), the UE may send MSG3 using the uplink grant scheduled in the random access response (Step 3 of CBRA in FIG. 11) and may monitor contention resolution as shown in FIG. 11 (Step 4 of CBRA in FIG. 11). If contention resolution is not successful after MSG3 (re)transmission(s), the UE may go back to MSG1 transmission.

The MSGA of the 2-step RA type may include a preamble on PRACH and a payload on PUSCH (e.g., Step A of CBRA in FIG. 12). After MSGA transmission, the UE may monitor for a response from the network within a configured window. For CFRA, dedicated preamble and PUSCH resource may be configured for MSGA transmission (Steps 0 and A of CFRA in FIG. 12) and upon receiving the network response (Step B of CFRA in FIG. 12), the UE may end the random access procedure as shown in FIG. 12. For CBRA, if contention resolution is successful upon receiving the network response (Step B of CBRA in FIG. 12), the UE may end the random access procedure as shown in FIG. 12; while if fallback indication is received in MSGB, the UE may perform MSG3 transmission using the uplink grant scheduled in the fallback indication and may monitor contention resolution. If contention resolution is not successful after MSG3 (re)transmission(s), the UE may go back to MSGA transmission.

Figure 13:
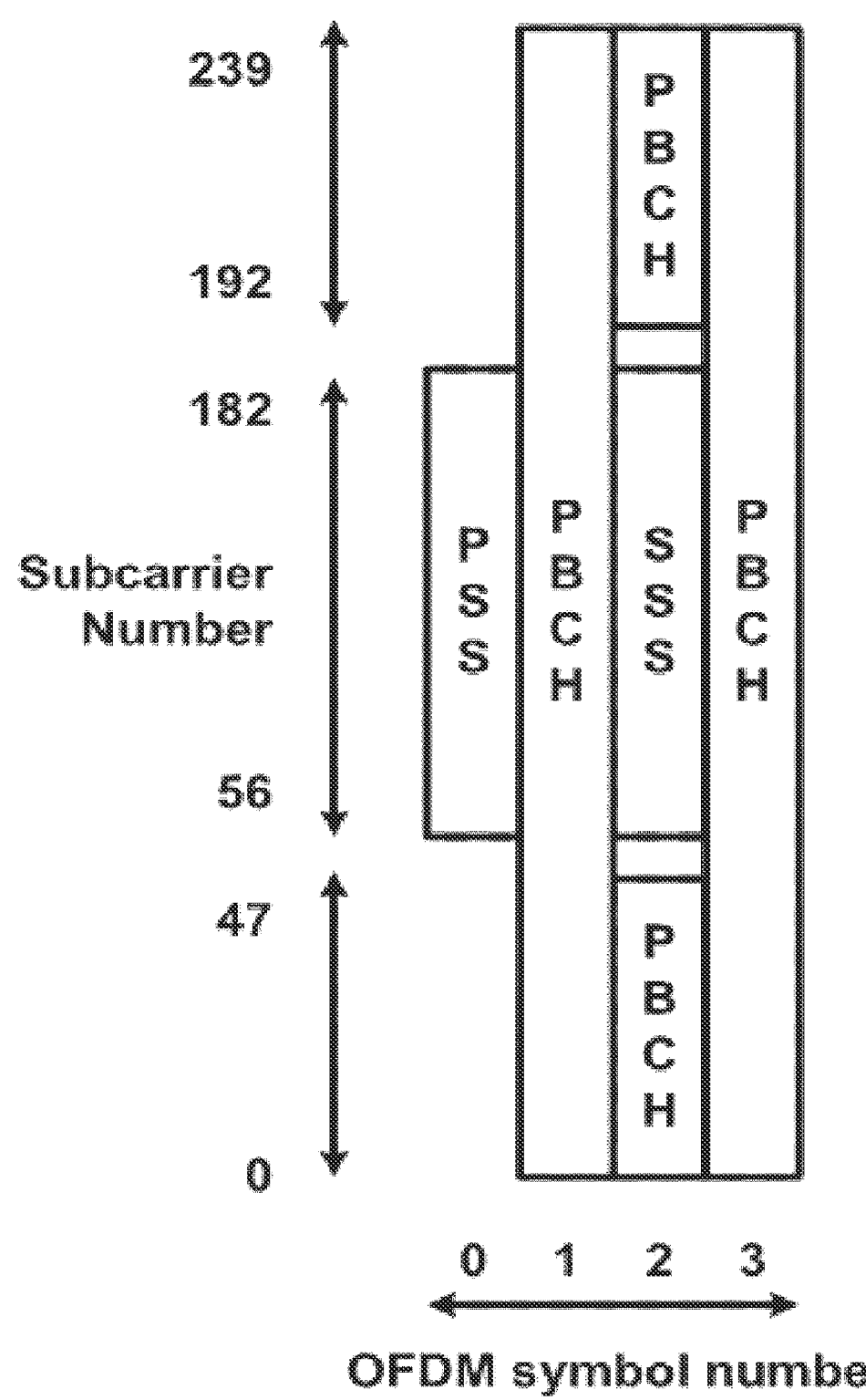
FIG. 13 shows example time and frequency structure of Synchronization Signal and Physical Broadcast Channel (PBCH) Block (SSB) according to some aspects of one or more exemplary embodiments of the present disclosure.

FIG. 13 shows example time and frequency structure of Synchronization Signal and Physical Broadcast Channel (PBCH) Block (SSB) according to some aspects of one or more exemplary embodiments of the present disclosure. The SS/PBCH Block (SSB) may consist of Primary and Secondary Synchronization Signals (PSS, SSS), each occupying 1 symbol and 127 subcarriers (e.g., subcarrier numbers 56 to 182 in FIG. 13), and PBCH spanning across 3 OFDM symbols and 240 subcarriers, but on one symbol leaving an unused part in the middle for SSS as show in FIG. 13. The possible time locations of SSBs within a half-frame may be determined by sub-carrier spacing and the periodicity of the half-frames, where SSBs are transmitted, may be configured by the network. During a half-frame, different SSBs may be transmitted in different spatial directions (i.e., using different beams, spanning the coverage area of a cell).

The PBCH may be used to carry Master Information Block (MIB) used by a UE during cell search and initial access procedures. The UE may first decode PBCH/MIB to receive other system information. The MIB may provide the UE with parameters required to acquire System Information Block 1 (SIB1), more specifically, information required for monitoring of PDCCH for scheduling PDSCH that carries SIB1. In addition, MIB may indicate cell barred status information. The MIB and SIB1 may be collectively referred to as the minimum system information (SI) and SIB1 may be referred to as remaining minimum system information (RMSI). The other system information blocks (SIBs) (e.g., SIB2, SIB3, . . . , SIB10 and SIBpos) may be referred to as Other SI. The Other SI may be periodically broadcast on DL-SCH, broadcast on-demand on DL-SCH (e.g., upon request from UEs in RRC Idle State, RRC Inactive State, or RRC connected State), or sent in a dedicated manner on DL-SCH to UEs in RRC Connected State (e.g., upon request, if configured by the network, from UEs in RRC Connected State or when the UE has an active BWP with no common search space configured).

Figure 14:
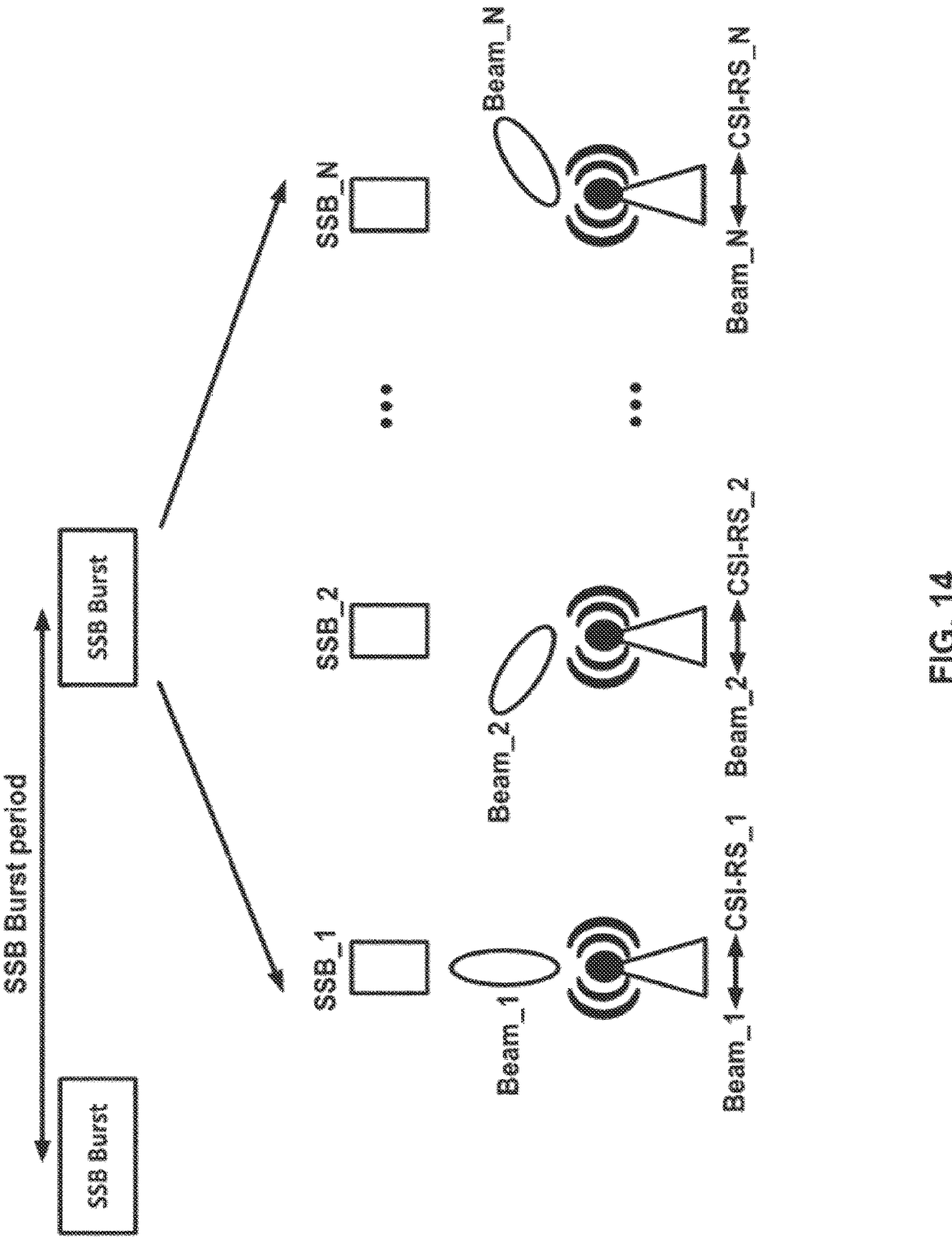
FIG. 14 shows example SSB burst transmissions according to some aspects of one or more exemplary embodiments of the present disclosure.

FIG. 14 shows example SSB burst transmissions according to some aspects of one or more exemplary embodiments of the present disclosure. An SSB burst may include N SSBs (e.g., SSB_1, SSB_2, . . . , SSB_N) and each SSB of the N SSBs may correspond to a beam (e.g., Beam_1, Beam_2, . . . , Beam_N). The SSB bursts may be transmitted according to a periodicity (e.g., SSB burst period). During a contention-based random access process, a UE may perform a random access resource selection process, wherein the UE first selects an SSB before selecting an RA preamble. The UE may select an SSB with an RSRP above a configured threshold value. In some embodiments, the UE may select any SSB if no SSB with RSRP above the configured threshold is available. A set of random access preambles may be associated with an SSB. After selecting an SSB, the UE may select a random access preamble from the set of random access preambles associated with the SSB and may transmit the selected random access preamble to start the random access process.

In some embodiments, a beam of the N beams may be associated with a CSI-RS resource (e.g., CSI-RS_1, CSI-RS_2, . . . , CSI-RS_N). A UE may measure CSI-RS resources and may select a CSI-RS with RSRP above a configured threshold value. The UE may select a random access preamble corresponding to the selected CSI-RS and may transmit the selected random access process to start the random access process. If there is no random access preamble associated with the selected CSI-RS, the UE may select a random access preamble corresponding to an SSB which is Quasi-Collocated with the selected CSI-RS.

In some embodiments, based on the UE measurements of the CSI-RS resources and the UE CSI reporting, the base station may determine a Transmission Configuration Indication (TCI) state and may indicate the TCI state to the UE, wherein the UE may use the indicated TCI state for reception of downlink control information (e.g., via PDCCH) or data (e.g., via PDSCH). The UE may use the indicated TCI state for using the appropriate beam for reception of data or control information. The indication of the TCI states may be using RRC configuration or in combination of RRC signaling and dynamic signaling (e.g., via a MAC control element (MAC CE) and/or based on a value of field in the downlink control information that schedules the downlink transmission). The TCI state may indicate a Quasi-Colocation (QCL) relationship between a downlink reference signal such as CSI-RS and the DM-RS associated with the downlink control or data channels (e.g., PDCCH or PDSCH, respectively).

In some embodiments, the UE may be configured with a list of up to M TCI-State configurations, using Physical Downlink Shared Channel (PDSCH) configuration parameters, to decode PDSCH according to a detected PDCCH with DCI intended for the UE and the given serving cell, where M may depend on the UE capability. Each TCI-State may contain parameters for configuring a QCL relationship between one or two downlink reference signals and the DM-RS ports of the PDSCH, the DM-RS port of PDCCH or the CSI-RS port(s) of a CSI-RS resource. The quasi co-location relationship may be configured by one or more RRC parameters. The quasi co-location types corresponding to each DL RS may take one of the following values: 'QCL-TypeA': {Doppler shift, Doppler spread, average delay, delay spread}; 'QCL-TypeB': {Doppler shift, Doppler spread}; 'QCL-TypeC': {Doppler shift, average delay}; 'QCL-TypeD': {Spatial Rx parameter}. The UE may receive an activation command (e.g., a MAC CE), used to map TCI states to the codepoints of a DCI field.

Figure 15:
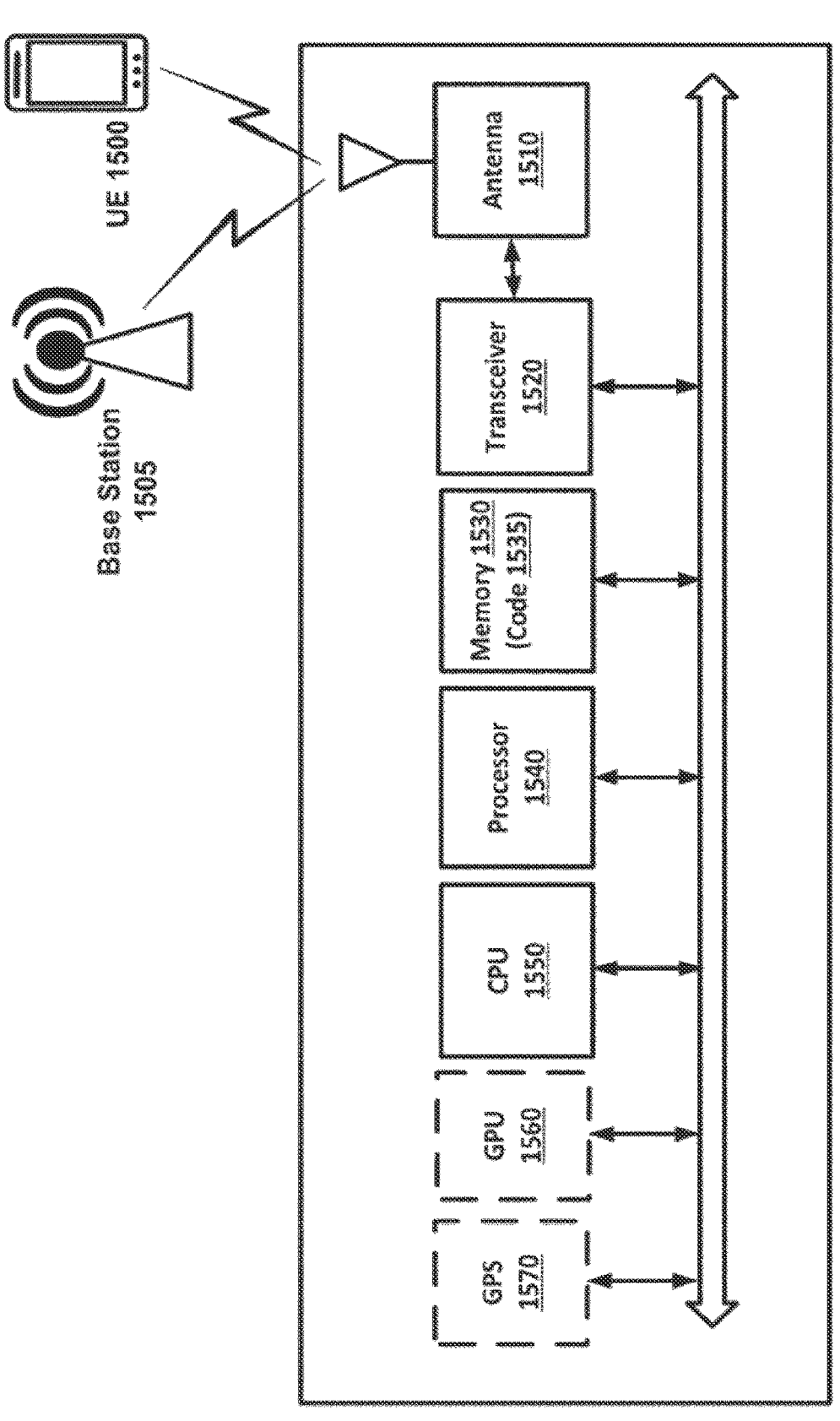
FIG. 15 shows example components of a user equipment and a base station for transmission and/or reception according to some aspects of one or more exemplary embodiments of the present disclosure.

FIG. 15 shows example components of a user equipment and a base station for transmission and/or reception according to some aspects of one or more exemplary embodiments of the present disclosure. In one embodiment, the illustrative components of FIG. 15 may be considered to be illustrative of functional blocks of an illustrative base station 1505. In another embodiment, the illustrative components of FIG. 15 may be considered to be illustrative of functional blocks of an illustrative user equipment (UE) 1500. Accordingly, the components illustrated in FIG. 15 are not necessarily limited to either a UE or base station.

The Antenna 1510 may be used for transmission or reception of electromagnetic signals. The Antenna 1510 may comprise one or more antenna elements and may enable different input-output antenna configurations including Multiple-Input Multiple Output (MIMO) configuration, Multiple-Input Single-Output (MISO) configuration and Single-Input Multiple-Output (SIMO) configuration. In some embodiments, the Antenna 1510 may enable a massive MIMO configuration with tens or hundreds of antenna elements. The Antenna 1510 may enable other multi-antenna techniques such as beamforming. In some examples and depending on the UE 1500 capabilities or the type of UE 1500 (e.g., a low-complexity UE), the UE 1500 may support a single antenna only.

The transceiver 1520 may communicate bi-directionally, via the Antenna 1510, wireless links as described herein. For example, the transceiver 1520 may represent a wireless transceiver at the UE and may communicate bi-directionally with the wireless transceiver at the base station or vice versa. The transceiver 1520 may include a modem to modulate the packets and provide the modulated packets to the Antenna 1510 for transmission, and to demodulate packets received from the Antenna 1510.

The memory 1530 may include RAM and ROM. The memory 1530 may store computer-readable, computer-executable code 1535 including instructions that, when executed, cause the processor to perform various functions described herein. In some examples, the memory 1530 may contain, among other things, a Basic Input/output System (BIOS) which may control basic hardware or software operation such as the interaction with peripheral components or devices.

The processor 1540 may include a hardware device with processing capability (e.g., a general-purpose processor, a digital signal processor (DSP), a central processing unit (CPU), a microcontroller, an application specific integrated circuit (ASIC), a field programmable gate array (FPGA), a programmable logic device, a discrete gate or transistor logic component, a discrete hardware component, or any combination thereof). In some examples, the processor 1540 may be configured to operate a memory using a memory controller. In other examples, a memory controller may be integrated into the processor 1540. The processor 1540 may be configured to execute computer-readable instructions stored in a memory (e.g., the memory 1530) to cause the UE 1500 or the base station 1505 to perform various functions.

The CPU 1550 may perform basic arithmetic, logic, controlling, and Input/output (I/O) operations specified by the computer instructions in the Memory 1530. The UE 1500 and/or the base station 1505 may include additional peripheral components such as a graphics processing unit (GPU) 1560 and a Global Positioning System (GPS) 1570. The GPU 1560 is a specialized circuitry for rapid manipulation and altering of the Memory 1530 for accelerating the processing performance of the UE 1500 and/or the base station 1505. The GPS 1570 may be used for enabling location-based services or other services for example based on geographical position of the UE 1500.

In some examples, the UE 1500 may be configured to or programmed to provide UE feedback. The UE 1500 may include a memory (e.g., memory 1530 of FIG. 15) storing instructions (e.g., code 1535 of FIG. 15) and a processor (e.g., processor 1540 of FIG. configured to or programmed to execute the instructions to perform a method. The method includes: receiving, by the UE, one or more messages comprising: one or more first configuration parameters for first UE feedback in a radio resource control (RRC) connected state; and one or more second configuration parameters for second UE feedback in an RRC idle state or an RRC inactive state; transmitting, by the UE, the first UE feedback, based on the one or more first configuration parameters, when the UE is in the RRC connected state; and transmitting, by the UE, the second UE feedback, based on the second configuration parameters, when the UE is in the RRC idle state or when the UE is in the RRC inactive state. The UE 1500 may receive the one or more messages from a base station (e.g., base station 1505) and provide the first UE feedback and the second UE feedback to the base station.

In some examples, the UE 1500 may be configured to or programmed to provide UE feedback. The UE 1500 may include a memory (e.g., memory 1530 of FIG. 15) storing instructions (e.g., code 1535 of FIG. 15) and a processor (e.g., processor 1540 of FIG. configured to or programmed to execute the instructions to perform a method. The method includes: receiving, by a UE, one or more configuration parameters for the UE feedback associated with the MBSs; determining, by the UE, based on the one or more configuration parameters, a first timing for transmission of the UE feedback associated with the MBSs; and dropping the UE feedback associated with the MBSs from transmission at the first timing when the first timing for the UE feedback collides with a second timing for an uplink channel or an uplink signal. The UE 1500 may receive the one or more configuration parameters from a base station (e.g., base station 1505) and provide the UE feedback to the base station.

In some examples, the UE 1500 and the base station 1505 are included in a system for mobile communication. The base station may be configured to or programmed to transmit one or more messages comprising: one or more first configuration parameters for first UE feedback in a radio resource control (RRC) connected state; and one or more second configuration parameters for second UE feedback in an RRC idle state or an RRC inactive state. The UE may be configured to or programmed to: receive the one or more messages; transmit the first UE feedback, based on the one or more first configuration parameters, when the UE is in the RRC connected state; and transmit the second UE feedback, based on the second configuration parameters, when the UE is in the RRC idle state or when the UE is in the RRC inactive state.

In some examples, the UE 1500 and the base station 1505 are included in a system for mobile communication. The base station may be configured to or programmed to transmit one or more configuration parameters for UE feedback associated with multicast broadcast services (MBSs). The UE may be configured to or programmed to receive the one or more configuration parameters; determine a first timing for transmission of the UE feedback associated with the MBSs; and drop the UE feedback associated with the MBSs from transmission at the first timing when to the first timing of the UE feedback collides with a second timing of an uplink channel or an uplink signal.

In some example examples, MBS services may be enabled via single-cell transmission. MBS may be transmitted in the coverage of a single cell. One or more Multicast/Broadcast control channels (e.g., MCCHs) and one or more Multicast/Broadcast data channels (e.g., MTCHs) may be mapped on DL-SCH. The scheduling may be done by the gNB. The Multicast/Broadcast control channel and the Multicast/Broadcast data channel transmissions may be indicated by a logical channel specific RNTI on PDCCH. In some examples, a one-to-one mapping between a service identifier such as a temporary mobile group identifier (TMGI) and a RAN level identifier such as a group identifier (G-RNTI) may be used for the reception of the DL-SCH to which a Multicast/Broadcast data channel may be mapped. In some examples, a single transmission may be used for DL-SCH associated with the Multicast/Broadcast control channel and/or the Multicast/Broadcast data channel transmissions and HARQ or RLC retransmissions may not be used and/or an RLC Unacknowledged Mode (RLC UM) may be used. In other examples some feedback (e.g., HARQ feedback or RLC feedback) may be used for transmissions via Multicast/Broadcast control channel and/or Multicast/Broadcast data channels.

In some example examples, for Multicast/Broadcast data channel, the following scheduling information may be provided on Multicast/Broadcast control channel: a Multicast/Broadcast data channel scheduling cycle, a Multicast/Broadcast data channel on-duration (e.g., duration that the UE waits for, after waking up from DRX, to receive PDCCHs), a Multicast/Broadcast data channel inactivity timer (e.g., duration that the UE waits to successfully decode a PDCCH, from the last successful decoding of a PDCCH indicating the DL-SCH to which this Multicast/Broadcast data channel is mapped, failing which it re-enters DRX).

In some examples, one or more UE identities may be related to MBS transmissions. The one or more identities may comprise at least one of: one or more first RNTIs that identify transmissions of the Multicast/Broadcast control channel; one or more second RNTIs that identify transmissions of a Multicast/Broadcast data channels. The one or more first RNTIs that identify transmissions of the Multicast/Broadcast control channel may comprise a single cell RNTI (SC-RNTI, other names may be used). The one or more second RNTIs that identify transmissions of a Multicast/Broadcast data channels may comprise a G-RNTI (nG-RNTI or other names may be used).

In some examples, one or more logical channels may be related to MBS transmissions. The one or more logical channels may comprise a Multicast/Broadcast control channel. The Multicast/Broadcast control channel may be a point-to-multipoint downlink channel used for transmitting MBS control information from the network to the UE, for one or several Multicast/Broadcast data channel. This channel may be used by UEs that receive or are interested to receive MBS. The one or more logical channels may comprise a Multicast/Broadcast data channel. This channel may be a point-to-multipoint downlink channel for transmitting MBS traffic data from the network.

Figure 16:
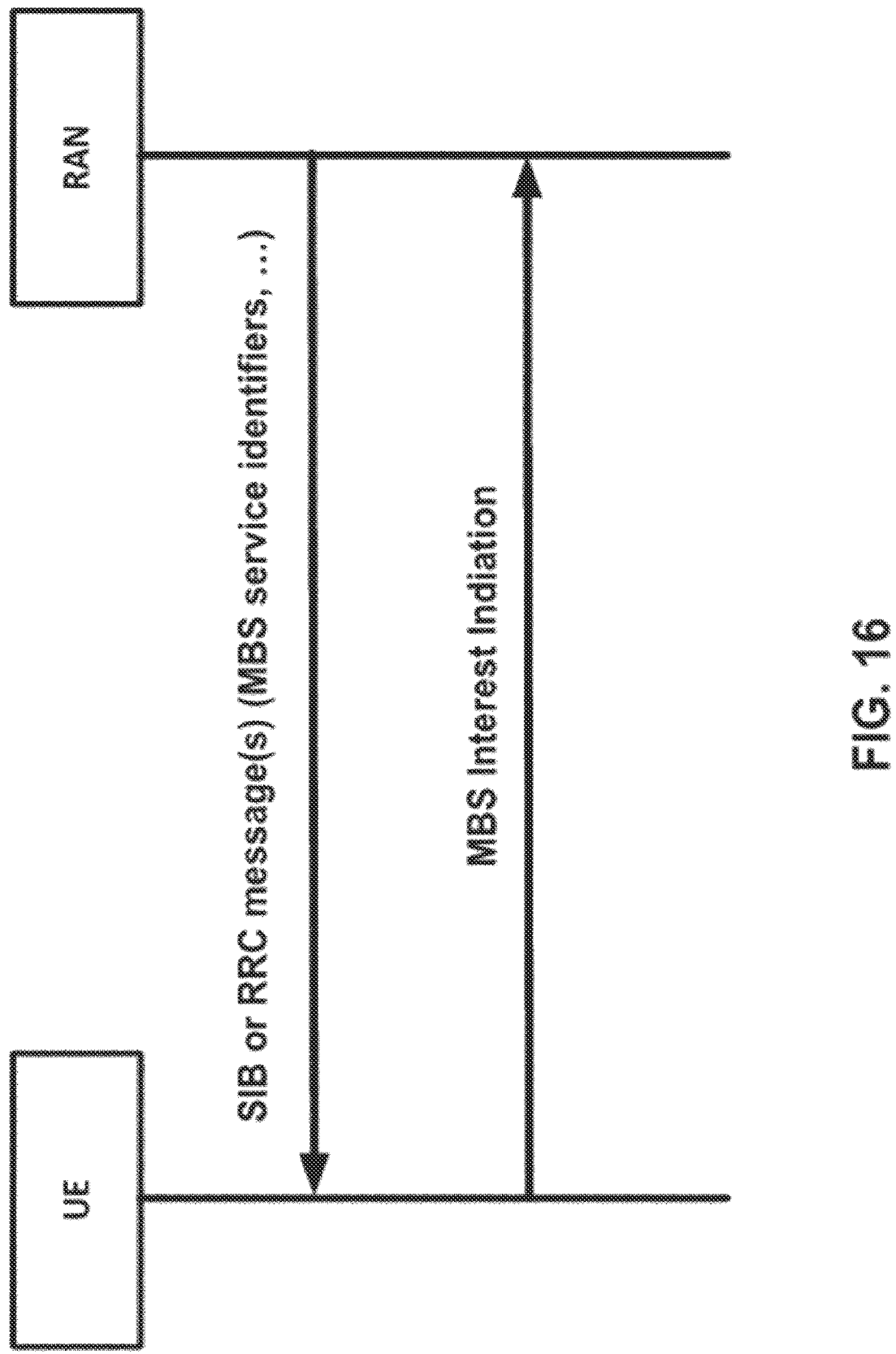
FIG. 16 shows an example multicast broadcast service (MBS) interest indication according to some aspects of one or more exemplary embodiments of the present disclosure.

In some examples, a procedure may be used by the UE to inform RAN that the UE is receiving or is interested to receive MBS service(s) via an MBS radio bearer, and if so, to inform the 5G RAN about the priority of MBS versus unicast reception or MBS service(s) reception in receive only mode. An example is shown in FIG. 16. The UE may transmit a message (e.g., an MBS interest indication message) message to inform RAN that the UE is receiving/ interested to receive or no longer receiving/interested to receive MBS service(s). The UE may transmit the message based on receiving one or more messages (e.g., a SIB message or a unicast RRC message) from the network for example indicating one or more MBS Service Area Identifiers of the current and/or neighboring carrier frequencies.

In some examples, the UE may consider an MBS service to be part of the MBS services of interest if the UE is capable of receiving MBS services (e.g., via a single cell point to multipoint mechanism); and/or the UE is receiving or interested to receive this service via a bearer associated with MBS services; and/or one session of this service is ongoing or about to start; and/or at least one of the one or more MBS service identifiers indicated by network is of interest to the UE.

In some examples, control information for reception of MBS services may be provided on a specific logical channel: (e.g., a MCCH). The MCCH may carry one or more configuration messages which indicate the MBS sessions that are ongoing as well as the (corresponding) information on when each session may be scheduled, e.g., scheduling period, scheduling window and start offset. The one or more configuration messages may provide information about the neighbor cells transmitting the MBS sessions which may be ongoing on the current cell. In some examples, the UE may receive a single MBS service at a time, or more than one MBS services in parallel.

In some example, the MCCH information (e.g., the information transmitted in messages sent over the MCCH) may be transmitted periodically, using a configurable repetition period. The MCCH transmissions (and the associated radio resources and MCS) may be indicated on PDCCH.

In some examples, change of MCCH information may occur at specific radio frames/subframes/slots and/or a modification period may be used. For example, within a modification period, the same MCCH information may be transmitted a number of times, as defined by its scheduling (which is based on a repetition period). The modification period boundaries may be defined by SFN values for which SFN mod m=0, where m is the number of radio frames comprising the modification period. The modification period may be configured by a SIB or by RRC signaling.

In some examples, when the network changes (some of) the MCCH information, it may notify the UEs about the change in the first subframe/slot which may be used for MCCH transmission in a repetition period. Upon receiving a change notification, a UE interested to receive MBS services may acquire the new MCCH information starting from the same subframe/slot. The UE may apply the previously acquired MCCH information until the UE acquires the new MCCH information.

In an example, a system information block (SIB) may contain the information required to acquire the control information associated transmission of MBS. The information may comprise at least one of: one or more discontinuous reception (DRX) parameters for monitoring for scheduling information of the control information associated transmission of MBS, scheduling periodicity and offset for scheduling information of the control information associated transmission of MBS, modification period for modification of content of the control information associated transmission of MBS, repetition information for repetition of the control information associated transmission of MBS, etc.

In an example, an information element (IE) may provide configuration parameters indicating, for example, the list of ongoing MBS sessions transmitted via one or more bearers for each MBS session, one or more associated RNTIs (e.g., G-RNTI, other names may be used) and scheduling information. The configuration parameters may comprise at least one of: one or more timer values for discontinuous reception (DRX) (e.g., an inactivity timer or an On Duration timer), an RNTI for scrambling the scheduling and transmission of a Multicast/Broadcast traffic channel (e.g., MTCH, other names may be used), ongoing MBS session, one or more power control parameters, one or more scheduling periodicity and/or offset values for one or more MBS traffic channels, information about list of neighbor cells, etc.

In some examples a gNB or ng-eNB may comprise logical nodes that host some, all or parts of the user plane and/or control plane functionalities. For example, a gNB Central Unit (gNB-CU) may be a logical node hosting RRC, SDAP and PDCP protocols of the gNB or RRC and PDCP protocols of the en-gNB that controls the operation of one or more gNB-DUs. The gNB-CU may terminate the F1 interface connected with the gNB-DU. A gNB Distributed Unit (gNB-DU) may be a logical node hosting RLC, MAC and PHY layers of the gNB or en-gNB, and its operation may be partly controlled by gNB-CU. One gNB-DU may support one or multiple cells. One cell may be supported by only one gNB-DU. The gNB-DU may terminate the F1 interface connected with the gNB-CU. A gNB-CU-Control Plane (gNB-CU-CP) may be a logical node hosting the RRC and the control plane part of the PDCP protocol of the gNB-CU for an en-gNB or a gNB. The gNB-CU-CP may terminate the E1 interface connected with the gNB-CU-UP and the F1-C interface connected with the gNB-DU. A gNB-CU-User Plane (gNB-CU-UP) may be a logical node hosting the user plane part of the PDCP protocol of the gNB-CU for an en-gNB, and the user plane part of the PDCP protocol and the SDAP protocol of the gNB-CU for a gNB. The gNB- CU-UP may terminate the E1 interface connected with the gNB-CU-CP and the F1-U interface connected with the gNB-DU.

In some examples, a CSI-AperiodicTriggerStateList IE may be used to configure the UE with a list of aperiodic trigger states. Each codepoint of the DCI field "CSI request" may be associated with one trigger state. Upon reception of the value associated with a trigger state, the UE may perform measurement of CSI-RS, CSI-IM and/or SSB (reference signals) and aperiodic reporting on L1 according to all entries in the associated ReportConfigInfoList for that trigger state. A csi-IM-ResourcesForInterference field may indicate CSI-IM-ResourceSet for interference measurement. A csi-SSB-ResourceSet field may indicate CSI-SSB-ResourceSet for channel measurements. A nzp-CSI-RS-ResourcesForInterference field may indicate NZP-CSI-RS-ResourceSet for interference measurement. A qcl-info field may indicate a list of references to TCI-States for providing the QCL source and QCL type for each NZP-CSI-RS-Resource listed in nzp-CSI-RS-Resources of the NZP-CSI-RS-ResourceSet indicated by nzp-CSI-RS-Resources-forChannel. Each TCI-StateId refers to the TCI-State which may have this value for tci-StateId and may be defined in tci-StatesToAddModList in the PDSCH-Config included in the BWP-Downlink corresponding to the serving cell and to the DL BWP to which the resourcesForChannelMeasurement (in the CSI-ReportConfig indicated by reportConfigId above) belong to. A reportConfigId may indicate the report-ConfigId of one of the CSI-ReportConfigToAddMod configured in CSI-MeasConfig. A resourceSet field may indicate NZP-CSI-RS-ResourceSet for channel measurements.

In some examples, a CSI-FrequencyOccupation IE may be used to configure the frequency domain occupation of a channel state information measurement resource (e.g. NZP-CSI-RS-Resource, CSI-IM-Resource). A nrofRBs field may indicate a number of PRBs across which this CSI resource spans. A startingRB field may indicate a PRB where this CSI resource starts in relation to common resource block #0 (CRB #0) on the common resource block grid.

In some examples, a CSI-IM-Resource IE may be used to configure one CSI Interference Management (IM) resource.

In some examples, the IE CSI-IM-ResourceId may be used to identify one CSI-IM-Resource.

In some examples, the IE CSI-IM-ResourceSet may be used to configure a set of one or more CSI Interference Management (IM) resources (their IDs) and set-specific parameters.

In some examples, The IE CSI-IM-ResourceSetId may be used to identify CSI-IM-ResourceSets.

In some examples, the IE CSI-MeasConfig may be used to configure CSI-RS (reference signals) belonging to the serving cell in which CSI-MeasConfig is included, channel state information reports to be transmitted on PUCCH on the serving cell in which CSI-MeasConfig is included and channel state information reports on PUSCH triggered by DCI received on the serving cell in which CSI-MeasConfig is included.

In some examples, the IE CSI-ReportConfigId may be used to identify one CSI-ReportConfig.

In some examples, the IE CSI-ResourceConfig may define a group of one or more NZP-CSI-RS-ResourceSet, CSI-IM-ResourceSet and/or CSI-SSB-ResourceSet.

In some examples, the IE CSI-ResourceConfigId may be used to identify a CSI-ResourceConfig.

In some examples, the IE CSI-ResourcePeriodicityAnd-Offset may be used to configure a periodicity and a corresponding offset for periodic and semi-persistent CSI resources, and for periodic and semi-persistent reporting on PUCCH. both, the periodicity and the offset may be given in number of slots.

In some examples, the IE CSI-RS-ResourceConfigMobility may be used to configure CSI-RS based RRM measurements.

In some examples, the IE CSI-RS-ResourceMapping may be used to configure the resource element mapping of a CSI-RS resource in time- and frequency domain.

In some examples, the CSI-SemiPersistentOnPUSCH-TriggerStateList IE may be used to configure the UE with list of trigger states for semi-persistent reporting of channel state information on L1.

In some examples, the IE CSI-SSB-ResourceSet may be used to configure one SS/PBCH block resource set which may refer to SS/PBCH as indicated in ServingCell-Config-Common.

In some examples, the IE CSI-SSB-ResourceSetId may be used to identify one SS/PBCH block resource set.

In some examples, an RRCRelease message may be used to command the release of an RRC connection or the suspension of the RRC connection. A cnType field may indicate that the UE is redirected to EPC or 5GC. A deprioritisationReq field may indicate whether the current frequency or RAT is to be de-prioritised. A deprioritisation-Timer field may indicate the period for which either the current carrier frequency or NR is deprioritised. A suspend-Config field may indicate configuration for the RRC_INAC-TIVE state. The network may not configure suspendConfig when the network redirect the UE to an inter-RAT carrier frequency or if the UE is configured with a DAPS bearer. A redirectedCarrierInfo field may indicate a carrier frequency (downlink for FDD) and may be used to redirect the UE to an NR or an inter-RAT carrier frequency, by means of cell selection at transition to RRC IDLE or RRC_INACTIVE. A carrierFreq field may indicate the redirected NR frequency. A ssbSubcarrierSpacing field may indicate subcarrier spacing of SSB in the redirected SSB frequency. A smtc field may indicate the SSB periodicity/offset/duration configuration for the redirected SSB frequency. It is based on timing reference of PCell. If the field is absent, the UE may use the SMTC configured in the measObjectNR having the same SSB frequency and subcarrier spacing. A cellList may indicate a list of cells configured as RAN area. A ran-AreaConfigList field may indicate a list of RAN area codes or RA code(s) as RAN area. A plmn-Identity field may indicate a PLMN Identity to which the cells in ran-Area belong. If the field is absent the UE may use the ID of the registered PLMN. A ran-AreaCells field may indicate total number of cells of all PLMNs.

In some examples, DCI format 1_1 may be used for the scheduling of PDSCH in one cell. A DCI format 1_1 with CRC scrambled by C-RNTI or CS-RNTI or MCS-C-RNTI may comprise a Transmission configuration indication field which may have a bitwidth of 0 bit if higher layer parameter tci-PresentInDCI is not enabled; otherwise the bitwidth of this field may be 3 bits. If the Bandwidth part indicator field indicates a bandwidth part other than the active bandwidth part, if the higher layer parameter tci-PresentInDCI is not enabled for the CORESET used for the PDCCH carrying the DCI format 1_1, the UE may assume tci-PresentInDCI is not enabled for all CORESETs in the indicated bandwidth part; otherwise, the UE may assume tci-PresentInDCI is enabled for all CORESETs in the indicated bandwidth part.

In some examples, DCI format 1_2 may be used for the scheduling of PDSCH in one cell. A DCI format 1_2 with CRC scrambled by C-RNTI or CS-RNTI or MCSC-RNTI may comprise a Transmission configuration indication field which may have a bitwidth of 0 bit if higher layer parameter tci-PresentForDCI-Format1-2 is not enabled; otherwise the bitwidth may be 1 or 2 or 3 bits determined by higher layer parameter tci-PresentForDCI-Format1-2. If a Bandwidth part indicator field indicates a bandwidth part other than the active bandwidth part, if the higher layer parameter tci-PresentForDCI-Format1-2 is not enabled for the CORESET used for the PDCCH carrying the DCI format 1_2, the UE may assume tci-PresentForDCI-Format1-2 is not enabled for all CORESETs in the indicated bandwidth part; otherwise, the UE may assume tci-PresentForDCI-Format1-2 is enabled for all CORESETs in the indicated bandwidth part.

In some example, for point to multipoint (PTM) delivery of MBS data to a group of UEs, it may be sufficient for the UE to report a wideband channel quality indicator (WB-CQI) (e.g., limited to the bandwidth part (BWP) on which the PTM service is delivered) along with a rank indicator (RI) (e.g., if spatial multiplexing for PTM is supported by the system) for the gNB to perform the necessary link adaptation for the PTM transmission.

In some examples, the CQI measurements may not be based on instantaneous CSI-RS measurements and may be based on actual (e.g., time-averaged) BLER measurements at the UE. For example, CSI-RS measurements may be affected by instantaneous interference fluctuations based on which the gNB may not adapt its multicast transmission (e.g., for MBS services). In some examples, a CSI-RS resource indicator (CRI) field of a CSI report may be saved in the CSI report for PTM.

In some examples, a UE may report a wideband channel quality indicator along with a rank indicator (RI) (e.g., if spatial multiplexing for PTM is supported by the system) for the gNB to perform the necessary link adaptation for the PTM transmission. In some example, when using NACK-only based HARQ feedback along with CSI reporting, CQI measurements may be done based on actual (e.g., time-averaged) block error rate (BLER) measurements at the UEs, rather than (instantaneous) CSI-RS measurements. In some example, compact CSI report formats may be defined for multicast transmission. For example, only a CQI or CQI along with an RI may be reported.

In some examples, the CSI-RS may be transmitted in the active BWP. The CSI-RS for multicast transmission may be limited within the Multicast (MC) BWP, where the MC BWP may be only the subband of the UE's active BWPs.

In some examples, CSI-RS transmission and CSI reporting may be triggered for a group of multicast UEs. In some examples, a group-common DL grant (GC-PDCCH to schedule GC-PDSCH) may be used to trigger a A-CSI-RS transmission. The A-CSI-RS transmitted by gNB may be used for a group of multicast UEs. In some examples, based on the common A-CSI-RS, each UE may report CSI measurement results on per-UE PUSCH scheduled by gNB separately. The GC-PDCCH may trigger A-CSI-RS transmission in Multicast BWP.

In some examples, for multicast communication, the beam for multicast transmission may be different from that of unicast communication to a particular UE. The multicast beam may be transmitted from multiple cells in an SFN area. The configuration of the DL TRS/CSI-RS for TCI states for GC-PDCCH/PDSCH may be separate from unicast one.

In some examples, the beam failure detection for multicast may be associated with GC-PDCCH/GC-PDSCH in the Multicast BWP. When a UE fails to receive the unicast PDCCH, the UE may trigger the beam failure and recovery over PRACH or PUCCH. When a UE detects multicast beam failure, the beam recovery for multicast transmission may be assisted by using unicast connection for Multicast RRC CONNECTED UEs, i.e., the link radio recovery (LRR) and LRR response may be via unicast link by serving cell.

In some examples, in contrast to the PTP case that involves the feedback from a single UE, gNB may account for the feedback from multiple UEs involved in the PTM transmission while selecting the beamforming or precoding vector and the MCS index.

In some examples, by selecting the MCS based on the CQI corresponding to the worst-case UE (e.g., the spectral efficiency corresponding to the minimum of the desired spectral efficiencies of all the UEs), the gNB may ensure reliability even for the UEs experiencing the worst-case channel quality.

In some examples, the MBS design may be based on a single cell point-to-multipoint (PTM) architecture without use of single frequency network (SFN) framework. The reliable and efficient delivery MBS data to users in a multicast group, especially at frequency range 2 (FR2) may require transmissions across multiple nodes, TRPs and/or beams. In some examples, reliable delivery of MBS data with service continuity and mobility may require transmission of data from multiple transmission reception points (TRPs) and/or beams.

Figure 17:
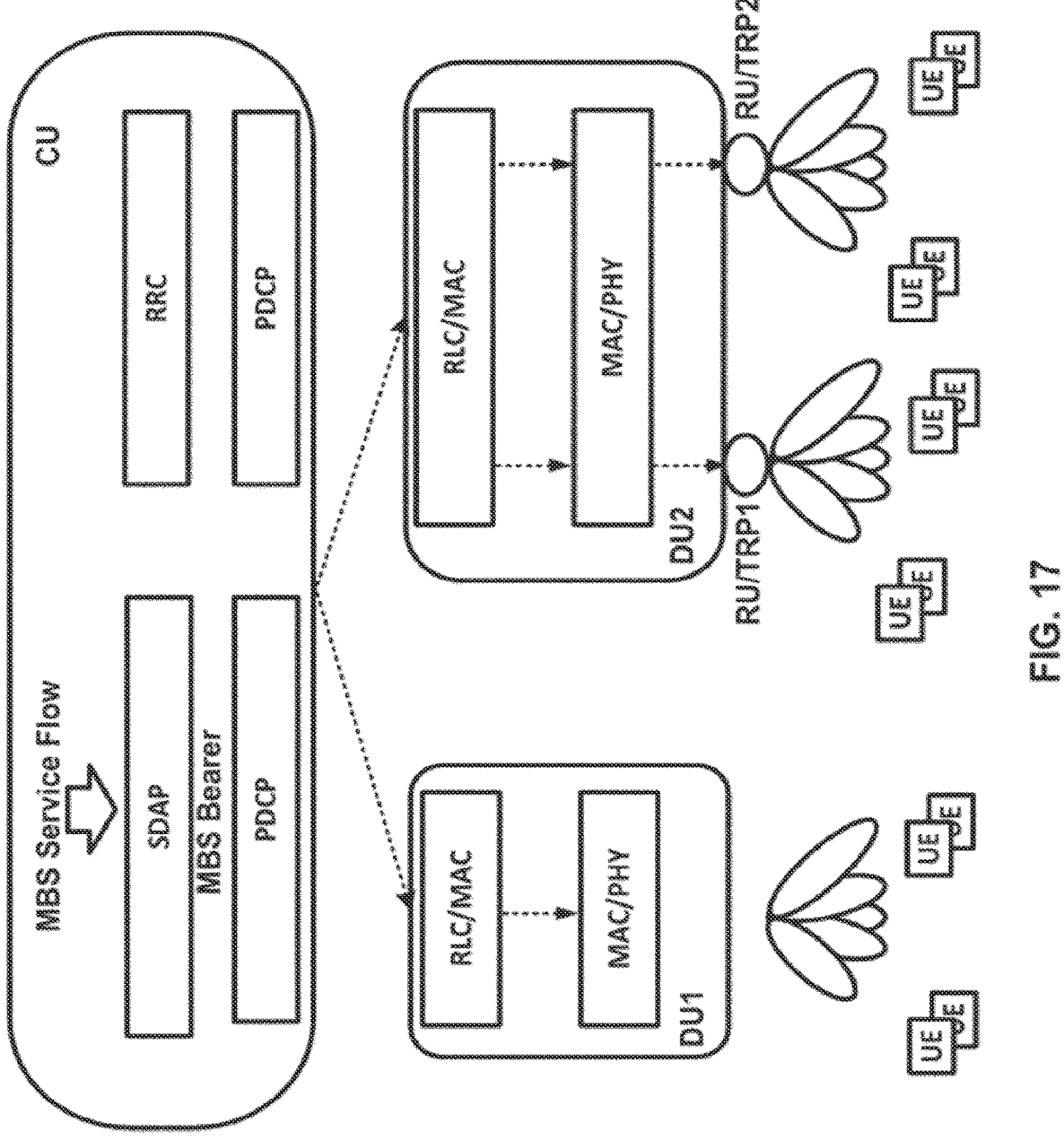
FIG. 17 shows example selective multicast broadcast service (MBS) transmissions involving multiple distributed units (DUs), remote units (RUs), transmission reception points (TRPs) and/or beams according to some aspects of one or more exemplary embodiments of the present disclosure.

Example embodiments may employ various multipoint transmission scenarios such as multi-connectivity involving multiple gNBs or Central Units (CUs); multiple TRPs across DUs with single CU, e.g., different MAC layers; multiple TRP across multiple Radio Units (RUs) within a DU managed by the same MAC layer; use of multiple beams within the same DU/RU; etc. An example scenario is shown in FIG. 17. Efficient and reliable delivery of MBS transmissions in FR1 and/or FR2 may allow use of multiple TRPs and beam forming to ensure coverage and reliability of MBS delivery.

In some examples, some or all members of a multicast group may be moving, e.g. in V2X application. The physical layer and radio transmission configuration, for example the selection of TRP(s) and/or DU(s) an/or beam(s) involved may be updated. In some examples, selection of TRP(s)/ DU(s)/beam(s) and proper configuration MBS PHY parameters may be closed loop requiring some feedback from UEs. Based on UEs feedback/measurement information the gNB may efficiently configure MBS transmission parameters and/or select TRP(s)/DU(s)/beam(s) for reliable and efficient MBS data and may affect overall spectrum efficiency. Maintaining efficient MBS delivery on one or multiple TRPs and/or beams may require some feedback from UEs within MBS group.

In some examples, the CSI feedback and QCL configuration for MBS may be included in MBS configuration supporting multi-TRP transmission. The framework may be based on multiple TRP operation with joint or selective coordinated transmission decisions based on aggregate of CSI feedback from UEs in the MBS group.

In some examples, to enhance reliability and QoS support of multicast services for UEs in RRC idle/inactive states and for broadcasting to all UEs in general, UE feedback in RRC idle/inactive states in addition to RRC connected state may be beneficial. Maintaining efficient MBS delivery on one or multiple TRPs and beams may be based on some feedback from UEs within MBS group.

In some examples, CSI feedback transmission from individual UEs for MBS may not be time critical as the CSI feedback may be considered collectively by gNB for any changes in MCS or MIMO/TRP/Beam configuration. In some examples, while resources may be configured for such CSI feedback, the CSI feedback by individual UEs may be sporadic, random and infrequent. In some examples, not all UEs receiving MBS service may send CSI feedback at a time and hence such CSI feedback may be triggered from a random subset of UEs. In some examples, the CSI feedback for MBS may not require periodic CSI feedback from UEs and may be configured as aperiodic or semi-persistent CSI transmissions. In some examples, a common set resources may be configured to be shared and randomly used by UEs within an MBS group to send CSI feedback for that MBS bundle.

Figure 18:
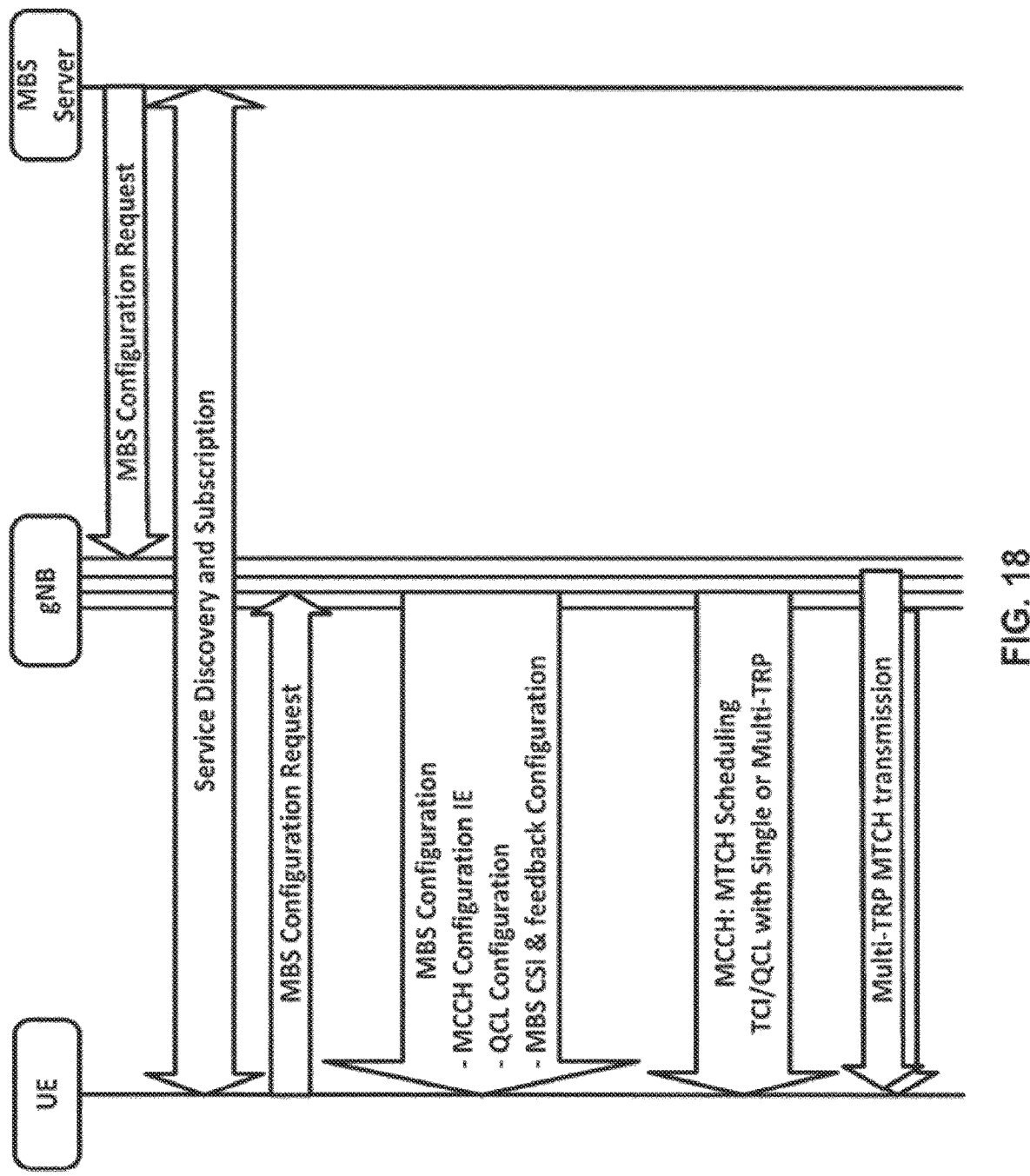
FIG. 18 shows example channel state information (CSI) and quasi colocation (QCL) configuration according to some aspects of one or more exemplary embodiments of the present disclosure.

In some examples, the MBS RAN configuration for a given service bundle may include a set of TRPs used for transmissions of associated multicast traffic channel (MTCH) and may use Quasi-CoLocation (QCL) with s set of CSI-RS or SSB reference signals. Example CSI and QCL configuration as part of MBS configuration in the RAN is shown in FIG. 18. The CSI feedback information needed for MBS may be primarily the CQI feedback and may be used for selection of best antenna ports e.g. set of CRI, SSB-RIs. Such feedback may allow gNB to identify best set of TRPs/beams to deliver MBS data based on close to real time distribution of member UEs. In some examples, the CSI feedback for MBS may be optimized to limit the information need by RAN to adjust MBS parameters. For example, a wideband or subband CQI feedback and a bitmap showing strongest selected RS's QCLs with MBS may be included. In some examples, separate PRACH resources may be associated with different TRP/beams and UEs may randomly send a CQI feedback on PRACH resources associated with strongest received TRP/Beams. In some examples, multiple CSI processes, e.g., combination of non-zero-power and zero-power CSI-RS/SSB-RS may be RRC configured and UE may send CSI feedback CSI-RS processes with best channel quality. In some examples, MBS specific CSI feedback information may be used for single and multi-TRP MBS transmission optimization by gNB.

In some examples, given gNB may receive several CSI feedback and may use them over time and missing some of them may not significantly impact its MBS configuration. In some examples, such CSI feedback may be skipped by UEs if they conflict with other uplink transmissions. The CSI feedback for MBS may have lower priority than other uplink transmissions from UE and may be dropped if causes conflicts with other data and control signaling transmissions. In some embodiments, the CSI feedback for MBS may have higher or equal priority than other uplink transmissions from UE. In these embodiments, the CSI feedback may be transmitted even if there is a conflict between the CSI feedback transmission and other data/control signal transmission. In some embodiments, as mentioned before, the CSI feedback can be any other types of UE feedback (e.g., HARQ feedback).

Figure 19:
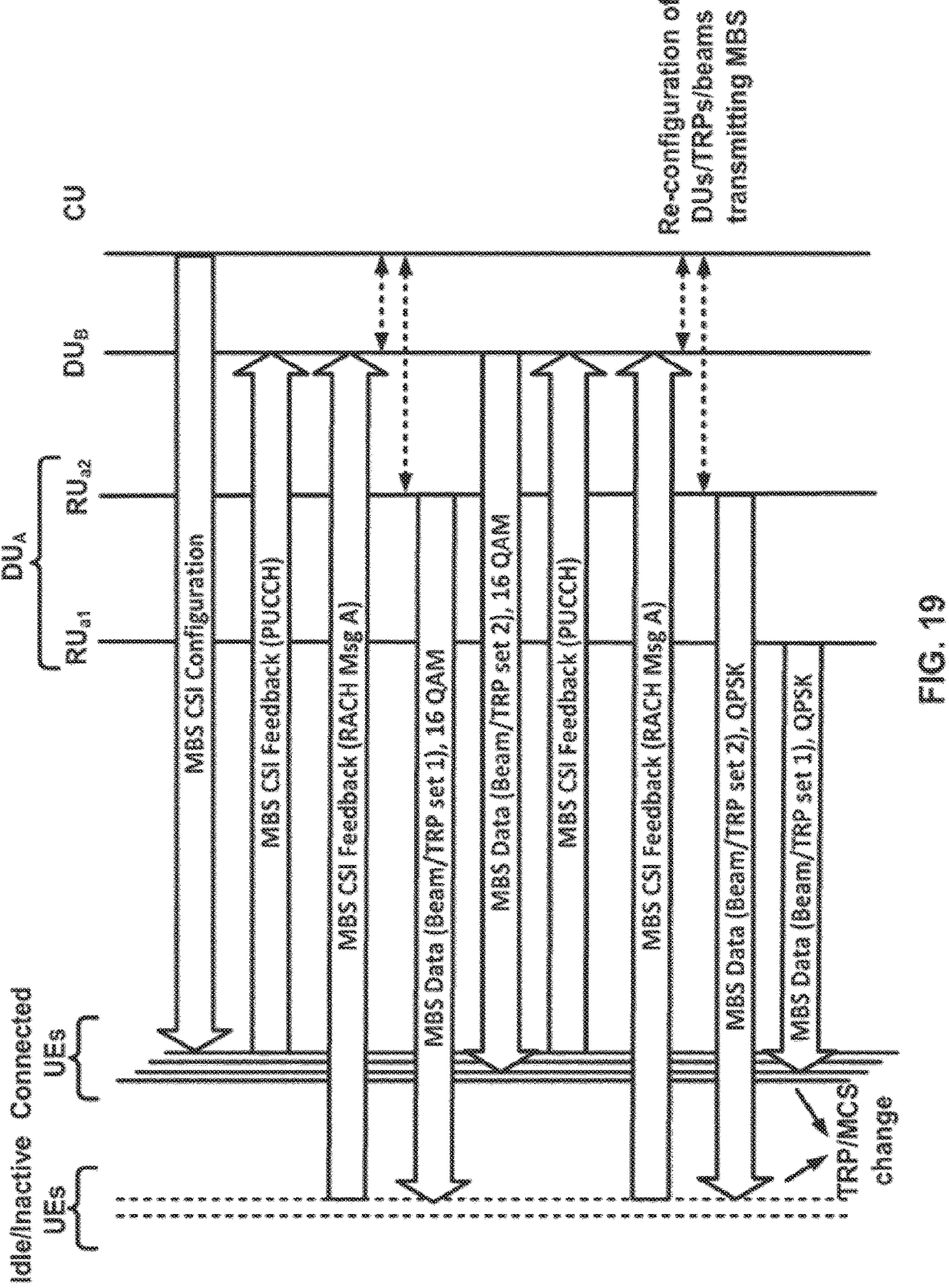
FIG. 19 shows example MBS CSI feedback from user equipments (UEs) in RRC connected state or idle/inactive state according to some aspects of one or more exemplary embodiments of the present disclosure.

In some examples, for multicast services with long session duration, some with periodic traffic patterns, many UEs may be receiving the MBS data mostly in idle/inactive state. In such cases for RAN to ensure proper use of radio and antenna resources to deliver MBS some form of CSI feedback from UEs even in inactive/idle state is needed. An example MBS CSI Feedback from random subset of Connected, Inactive and idle UEs using PUCCH and/or PRACH resources is shown in FIG. 19. In some examples, for some MBS services UEs in idle and inactive states may also be configured and allowed to send CSI feedback.

In some examples, a UE may be configured with some common PUCCH resources for idle/inactive state UEs to be used randomly UEs in the group based on their UE ID or other identifiers as seeds to send CSI feedback for MBS. In some examples, PUCCH for CSI feedback may be considered for inactive/idle state UEs which have maintained their uplink synchronization, e.g. UEs in small cells, in RRC connected state or recently suspended become inactive/idle.

In some examples, some common PRACH resources for idle/inactive state UEs may be configured using the same MBS sent as CSI feedback/report. The timing of the transmissions may be selected randomly by UEs in the group based on their UE ID or other identifiers as seeds to send CSI feedback for MBS. The UE identifiers may be utilized as seed values to determine probability values utilized in the determination of timing information.

In some examples, UEs in a particular RRC state, such as in RRC Inactive and Idle State, may send their CSI feedback using a truncated RACH procedure. The truncated RACH procedure may include sending CSI feedback in PUSCH part of message A in 2-step RACH without message B. The truncated RACH may alternatively include sending CSI feedback in PUSCH part of message 3 of 4-step RACH without message 4. The truncated RACH may illustratively utilize a designated message for transmission of the CSI feedback as illustrated in the above examples.

In some examples, MBS data may be delivered to the UEs in both RRC connected state and RRC idle or RRC inactive state. Existing CSI feedback mechanisms may not be sufficient to enable proper link adaptation or multi-TRP transmission of MBS data to UEs in the RRC idle or RRC inactive state. Example embodiments enhance CSI feedback to be used for link adaptation and/or multi-TRP operation for UEs in both RRC connected state or RRC idle/inactive state.

Figure 20:
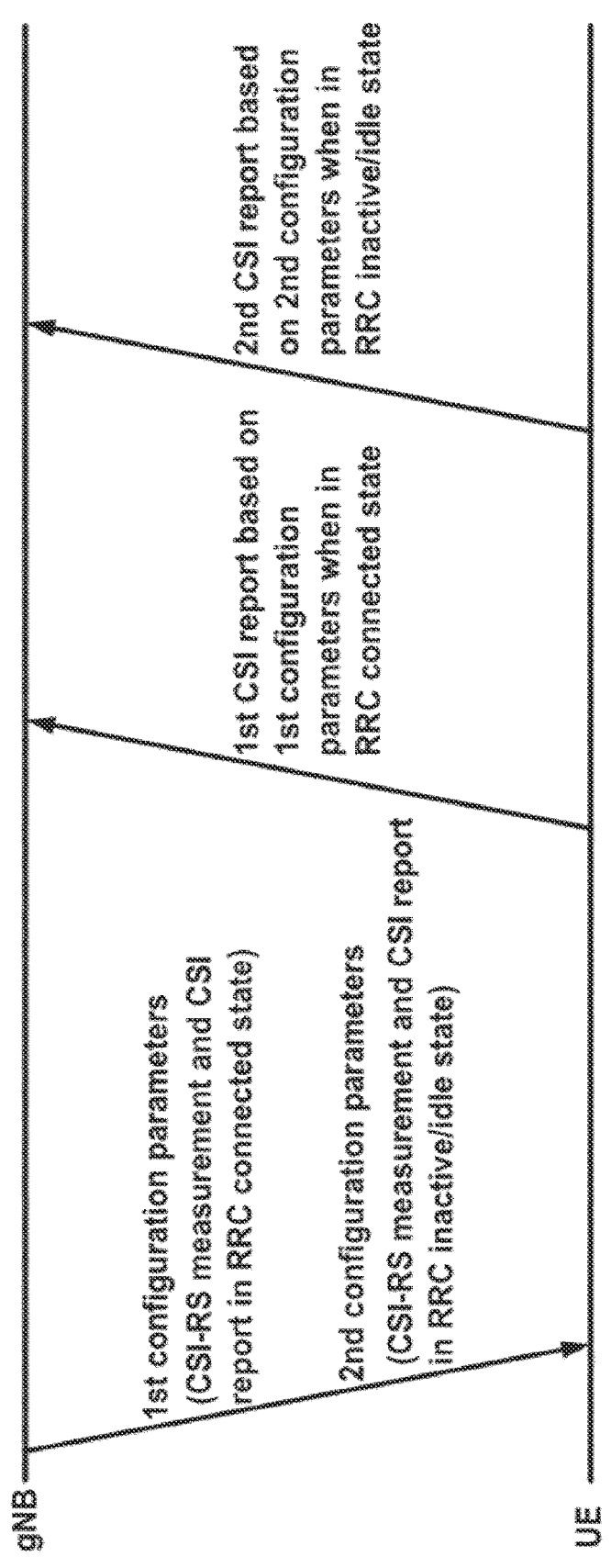
FIG. 20 shows an example process according to some aspects of one or more exemplary embodiments of the present disclosure.

In an example embodiment as shown in FIG. 20, a UE may receive one or more messages (e.g., one or more RRC messages). The one or more messages may comprise first configuration parameters and second configuration parameters. The first configuration parameters and the second configuration parameters may be for CSI-RS configuration, CSI-RS measurement, and CSI-RS reporting. The first configuration parameters may be for CSI-RS configuration, CSI-RS measurement, and CSI-RS reporting while the UE is in a first RRC state. The second configuration parameters may be for CSI-RS configuration, CSI-RS measurement, and CSI-RS reporting while the UE is in a second RRC state. The first RRC state may illustratively include an RRC connected state. The second RRC may illustratively include an RRC idle state or in an RRC inactive state.

The first configuration parameters may indicate a number of parameters or information. The first configuration parameters may indicate first radio resources for first CSI-RS reference signals. The first configuration parameters may indicate a first trigger state list. The first configuration parameters may indicate a first frequency domain occupation of channel state measurement. The first configuration parameters may indicate a first measurement configuration. Still further, the first configuration parameters may indicate a first reporting configuration. The first configuration parameters may indicate a first periodicity and offset (e.g., for periodic and semi-persistent reporting). The first configuration parameters may indicate first CSI-RS based RRM measurement parameters to be used by the UE while the UE is in the RRC connected state.

The second configuration parameters may indicate a number of parameters or information. The second configuration parameters may indicate second radio resources for second CSI-RS reference signals. The second configuration parameters may indicate a second trigger state list. The second configuration parameters may indicate a second frequency domain occupation of channel state measurement. The second configuration parameters may indicate a second measurement configuration. The second configuration parameters may indicate a second reporting configuration. The second configuration parameters may indicate a second periodicity and offset (e.g., for periodic and semi-persistent reporting). The second configuration parameters may indicate second CSI-RS based RRM measurement parameters to be used by the UE while UE is in the RRC connected state.

The UE may receive the first configuration parameters and the second configuration parameters while the UE is in the RRC connected state. In some examples, the first configuration parameters may be configured for delivering data associated with MBS services. In some examples, the second configuration parameters may be configured for delivering data associated with MBS services. In some examples, the UE may be configured with different CSI-RS related parameters (e.g., CSI-RS measurement and reporting) for MBS and unicast services (e.g., different CSI-RS related parameters for MBS and unicast services when the UE is in the RRC connected state). In some examples, the second configuration parameters, for the UE in the RRC idle or RRC inactive states, may be used by the UE only for MBS services. In some examples, the UE may receive the first configuration parameters, the second configuration parameters, or a combination as part of the MBS configuration (e.g., included in a message received via a logical multicast control channel). In some examples, the logical multicast control channel may comprise the second configuration parameters and may further comprise scheduling information for receiving MBS data. In some examples, the UE may transmit an MBS configuration request and/or an MBS interest indication message and may receive a first message comprising the second configuration parameters for CSI measurement and report during the RRC idle or RRC inactive state. In some examples, the UE may receive the second configuration parameters in an RRC release messages indicating a command for transitioning from the RRC connected state to the RRC idle state or the RRC inactive state (e.g., the first RRC state to a second RRC state). In some examples, the UE may receive the second configuration parameters in an information element (e.g., a suspend-config IE) of an RRC release message indicating a command for transitioning of the UE to the RRC inactive state.

While in the RRC connected state, the UE may use the first configuration parameters and may transmit a first CSI report based on the first configuration parameters. While in the RRC idle state or in the RRC inactive state, the UE may use the second configuration parameters and may transmit a second CSI report based on the second configuration parameters.

In some examples, the UE may transmit the first CSI report, or both the second CSI report based on a random trigger or otherwise processing a probability value. The UE may determine the probability value based on an identifier of the UE (e.g., a C-RNTI or other UE ID). The UE may use the identifier of the UE to determine a seed for calculating the probability value. In some examples, the UE may transmit the first CSI report, or both the second CSI report based on a request/command from the base station (e.g., based on a CSI request field of a DCI). In some examples, the UE may transmit the first CSI report, the second CSI report, or both periodically or semi-persistently. In some examples, the UE may transmit the first CSI report using an uplink control channel (e.g., PUCCH).

In some examples, the UE may transmit the second CSI report (while in the RRC idle state or in the RRC inactive state) using an uplink control channel (e.g., PUCCH), e.g., when the UE is uplink synchronized (e.g., based on a determination that the UE is uplink synchronized, e.g., if UE has a valid timing advance and/or when operating in small cells). In some examples, the UE may transmit the second CSI report based on a random access process. For example, the UE may transmit the second CSI report based on an uplink shared channel (e.g., PUSCH) transmitted during the random access process (e.g., PUSCH part of Msg A or Msg 3). The random access process may be a truncated random access process (e.g., a truncated two step random access process without Msg B or a truncated four step random access process without a Msg 4). In these examples, the CSI report is associated with a designated message.

In some examples, in response to transmitting the first CSI report, in the RRC connected state, the UE may receive first scheduling information. The base station may transmit the first scheduling information to the UE based on one or more CSI reports, from one or more UEs, comprising the first CSI report from the UE. The UE may receive the first scheduling information based on one or more first scheduling DCIs. The first scheduling information (e.g., received via the one or more first DCIs) may comprise one or more fields indicating a first TCI state. In some examples, the first configuration parameters may comprise first quasi-colocation configuration parameters indicating a first plurality of TCI states comprising the first TCI state. The first TCI state may indicate one or more first TRPs. In some examples, the one or more first TRPs may be associated with one or more first DUs of a base station. The UE may receive first data (e.g., MBS data) based on the one or more first TRPs. In some examples, in response to transmitting the second CSI report, in the RRC idle or RRC inactive state, the UE may receive second scheduling information. The UE may receive the second scheduling information based on one or more second scheduling DCIs. The base station may transmit the second scheduling information to the UE based on one or more CSI reports, from one or more UEs, comprising the second CSI report from the UE. The second scheduling information (e.g., received via the one or more second DCIs) may comprise one or more fields indicating a second TCI state. In some examples, the second configuration parameters may comprise second quasi-colocation configuration parameters indicating a second plurality of TCI states comprising the second TCI state. The second TCI state may indicate one or more second TRPs. In some examples, the one or more second TRPs may be associated with one or more second DUs of a base station. The UE may receive second data (e.g., MBS data) based on the one or more second TRPs.

Figure 21:
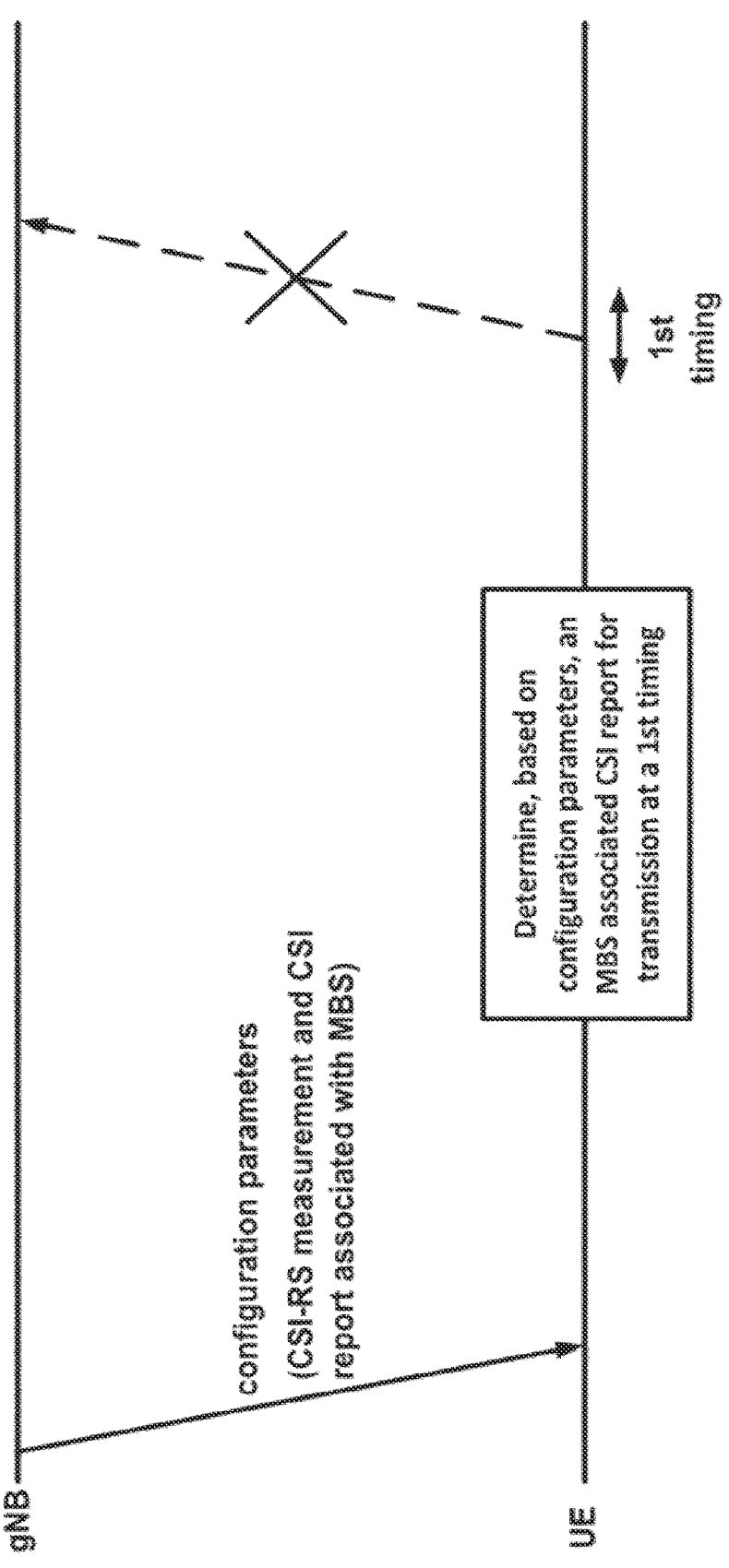
FIG. 21 shows an example process according to some aspects of one or more exemplary embodiments of the present disclosure.

In an example embodiment as shown in FIG. 21, a UE may receive one or more messages comprising configuration parameters. In an example, the one or more messages may comprise one or more RRC messages. The one or more messages may comprise CSI-RS measurement and reporting parameters. The one or more messages may include various types of information. The one or more messages can include radio resources for CSI-RS reference signals. The one or more messages can include a trigger state list. The one or more messages can include a frequency domain occupation of channel state measurement. The one or more messages can include a measurement configuration. The one or more messages can include a reporting configuration. The one or more messages can include a periodicity and offset (e.g., for periodic and semi-persistent reporting). The one or more messages can include CSI-RS based RRM measurement parameters.

The configuration parameters may be for CSI-RS measurement and CSI report associated with MBS services. The UE may generate and/or determine to generate a CSI report associated with the MBS services based on the configuration parameters and may determine a scheduled transmission of the CSI report to be at a first timing. The UE may drop the CSI report based on the first timing of the scheduled CSI report to collide with a second timing of an uplink channel (e.g., PUCCH, PUCCH, PRACH) or an uplink signal (e.g., SRS). The first timing of the CSI report may collide with the second timing of the uplink channel when one or more first symbols used for transmission of the first uplink channel, used for transmission of the CSI report, collides with one or more second symbols of the uplink channel or the uplink signal. In some examples, the UE may drop the CSI report based on the CSI report being associated with MBS services. In some examples, the uplink channel or the uplink signal may be associated with a priority and dropping the CSI report may be based on the priority of the uplink channel or the uplink signal. The priority associated with the uplink signal may be lower than, higher than, or equal to the priority of the CSI report. In some embodiment, as discussed above, the CSI report may include feedback of the UE (e.g., HARQ feedback) or may be replaced by feedback of the UE.

In an embodiment, a user equipment (UE) may receive one or more messages comprising: first configuration parameters for channel state information-reference signal (CSI-RS) measurement and CSI report in a radio resource control (RRC) connected state; and second configuration parameters for CSI-RS measurement and CSI report in an RRC idle state or an RRC inactive state. The UE may transmit a first CSI report, based on the first configuration parameters, when the UE is in the RRC connected state. The UE may transmit a second CSI report, based on the second configuration parameters, when the UE is in the RRC idle state or when the UE is in the RRC inactive state.

In some embodiments, transmitting the first channel state information (CSI) report may be via an uplink control channel.

In some embodiments, transmitting the second channel state information (CSI) report is via an uplink control channel. In some embodiments, the UE may determine that an uplink of the user equipment (UE) is time synchronized when the UE is in in the radio resource control (RRC) idle state or the RRC inactive state.

In some embodiments, transmitting the second channel state information (CSI) report may be based on a random access process. In some embodiments, the random access process is one of: a truncated four-step random access process without a Msg 4; and a truncated two-step random access process without a Msg B. In some embodiments, transmitting the second channel state information (CSI) report may be via a Msg 3 of a four-step random access process. In some embodiments, transmitting the second channel state information (CSI) report may be via a Msg A of a two-step random access process.

In some embodiments, the second configuration parameters may be associated with delivery of multicast broadcast service (MBS) data during the radio resource control (RRC) idle state or the RRC inactive state.

In some embodiments, the one or more messages may comprise a first message received in response to a multicast broadcast service (MBS) configuration request; and the first message may comprise the second configuration parameters.

In some embodiments, the user equipment (UE) may receive a logical multicast control channel carrying a configuration message comprising the second configuration parameters. In some embodiments, the logical multicast control channel may further carry scheduling information for receiving multicast broadcast service (MBS) data.

In some embodiments, the one or more messages may comprise a radio resource control (RRC) release message indicating a command for releasing an RRC connection; and the RRC release message may comprise the second configuration parameters. In some embodiments, the RRC release message may comprise a suspendconfig information element (IE) indicating the second configuration parameters.

In some embodiments, transmitting the second channel state information (CSI) report may be based on a random trigger. In some embodiments, the random trigger may be based on an identifier of the user equipment (UE). In some embodiments, the identifier of the user equipment (UE) may be a cell random network temporary identifier (C-RNTI). In some embodiments, the identifier of the user equipment (UE) may be used as a seed for determining a probability value indicating the random trigger.

In some embodiments, the second channel state information (CSI) report may be transmitted based on a request from a base station (BS).

In some embodiments, the second channel state information (CSI) report may be transmitted semi-persistently.

In some embodiments, the UE may receive first scheduling information, in response to transmitting the first channel state information (CSI) report, indicating a first transmission configuration indication (TCI) state associated with one or more first transmission reception points (TRPs). The UE may also receive second scheduling information, in response to transmitting the second channel state information (CSI) report, indicating a second transmission configuration indication (TCI) state associated with one or more second transmission reception points (TRPs).

In some embodiments, the UE may receive first data, when in the radio resource control (RRC) connected state, via the one or more first transmission reception points (TRPs). The UE may receive second data, when in the RRC idle state or when in the RRC inactive state, via the one or more second transmission reception points (TRPs).

In some embodiments, the one or more first transmission reception points (TRPs) may be associated with one or more first distributed units (DUs) of a base station; and the one or more second TRPs may be associated with one or more second DUs of the base station. In some embodiments, the first scheduling information may be received via at least one first downlink control information (DCI) comprising a first field indicating the first transmission configuration indication (TCI) state. Additionally, the second scheduling information may be received via at least one second DCI comprising a second field indicating the second TCI state. In some embodiments, receiving the first scheduling information may be based on a first plurality of channel state information (CSI) reports, from a first plurality of user equipments (UEs), comprising the first CSI report by the UE. Additionally, receiving the second scheduling information may be based on a second plurality of CSI reports, from a second plurality of UEs, comprising the second CSI report by the UE.

In some embodiments, the first configuration parameters may comprise first quasi-colocation configuration parameters; and the second configuration parameters may comprise second quasi-colocation configuration parameters. In some embodiments, the first quasi-colocation configuration parameters may indicate a first plurality of transmission configuration indication (TCI) states; and the second quasi-colocation configuration parameters may indicate a second plurality of TCI states.

In some embodiments, receiving the one or more messages may be while the user equipment (UE) is in the radio resource control (RRC) connected state.

In an embodiment, a user equipment (UE) may receive configuration parameters for channel state information-reference signal (CSI-RS) measurement and CSI report associated with multicast broadcast services (MBS). The UE may determine, based on the configuration parameters, a CSI report associated with the MBS services for transmission at a first timing. The UE may drop the CSI report based on a first timing of the CSI report colliding with a second timing associated with at least one of an uplink channel or an uplink signal.

In some embodiments, dropping the channel state information (CSI) report may further be based on the CSI report being associated with the multicast and broadcast service (MBS) services.

In some embodiments, dropping the channel state information (CSI) report may be based on a priority associated with the uplink channel or the uplink signal.

In some embodiments, the first timing of the channel state information (CSI) report may collide with the second timing of the uplink channel when one or more first symbols of a first uplink channel, used for transmission of the CSI report, collides with one or more second symbols of the uplink channel. The first timing of the CSI report may collide with the second timing of the uplink signal when one or more first symbols of the first uplink channel, used for transmission of the CSI report, collides with one or more second symbols of the uplink signal. In some embodiments, the first uplink channel may be an uplink control channel. In some embodiments, the first uplink channel may be an uplink shared channel.

The exemplary blocks and modules described in this disclosure with respect to the various example embodiments may be implemented or performed with a general-purpose processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. Examples of the general-purpose processor include but are not limited to a microprocessor, any conventional processor, a controller, a microcontroller, or a state machine. In some examples, a processor may be implemented using a combination of devices (e.g., a combination of a DSP and a microprocessor, multiple microprocessors, one or more microprocessors in conjunction with a DSP core, or any other such configuration).

The functions described in this disclosure may be implemented in hardware, software executed by a processor, firmware, or any combination thereof. Instructions or code may be stored or transmitted on a computer-readable medium for implementation of the functions. Other examples for implementation of the functions disclosed herein are also within the scope of this disclosure. Implementation of the functions may be via physically co-located or distributed elements (e.g., at various positions), including being distributed such that portions of functions are implemented at different physical locations.

Non-transitory computer-readable media includes but is not limited to non-transitory computer storage media. A non-transitory storage medium may be accessed by a general purpose or special purpose computer. Examples of non-transitory storage media include, but are not limited to, random access memory (RAM), read-only memory (ROM), electrically erasable programmable ROM (EEPROM), flash memory, compact disk (CD) ROM or other optical disk storage, magnetic disk storage or other magnetic storage devices, etc. A non-transitory medium may be used to carry or store desired program code means (e.g., instructions and/or data structures) and may be accessed by a general-purpose or special-purpose computer, or a general-purpose or special-purpose processor. In some examples, the software/program code may be transmitted from a remote source (e.g., a website, a server, etc.) using a coaxial cable, fiber optic cable, twisted pair, digital subscriber line (DSL), or wireless technologies such as infrared, radio, and microwave. In such examples, the coaxial cable, fiber optic cable, twisted pair, DSL, or wireless technologies such as infrared, radio, and microwave are within the scope of the definition of medium. Combinations of the above examples are also within the scope of computer-readable media.

As used in this disclosure, use of the term "or" in a list of items indicates an inclusive list. The list of items may be prefaced by a phrase such as "at least one of" or "one or more of". For example, a list of at least one of A, B, or C includes A or B or C or AB (i.e., A and B) or AC or BC or ABC (i.e., A and B and C). Also, as used in this disclosure, prefacing a list of conditions with the phrase "based on" shall not be construed as "based only on" the set of conditions and rather shall be construed as "based at least in part on" the set of conditions. For example, an outcome described as "based on condition A" may be based on both a condition A and a condition B without departing from the scope of this disclosure.

In this specification the terms "comprise", "include" or "contain" may be used interchangeably and have the same meaning and are to be construed as inclusive and open-ending. The terms "comprise", "include" or "contain" may be used before a list of elements and indicate that at least all of the listed elements within the list exist but other elements that are not in the list may also be present. For example, if A comprises B and C, both {B, C} and {B, C, D} are within the scope of A.

The present disclosure, in connection with the accompanied drawings, describes example configurations that are not representative of all the examples that may be implemented or all configurations that are within the scope of this disclosure. The term "exemplary" should not be construed as "preferred" or "advantageous compared to other examples" but rather "an illustration, an instance or an example." By reading this disclosure, including the description of the embodiments and the drawings, it will be appreciated by a person of ordinary skills in the art that the technology disclosed herein may be implemented using alternative embodiments. The person of ordinary skill in the art would appreciate that the embodiments, or certain features of the embodiments described herein, may be combined to arrive at yet other embodiments for practicing the technology described in the present disclosure. Thus, the disclosure is not limited to the examples and designs described herein but is to be accorded the broadest scope consistent with the principles and novel features disclosed herein.

Clause 1. A method of channel state information (CSI) feedback comprising:

receiving, by a user equipment (UE), one or more messages comprising:

first configuration parameters for channel state information-reference signal (CSI-RS) measurement and CSI report in a first radio resource control (RRC) state; and second configuration parameters for the CSI-RS measurement and the CSI report in a second RRC state;

transmitting a first CSI report, based on the first configuration parameters, when the UE is in the first RRC state; and transmitting a second CSI report, based on the second configuration parameters, when the UE is in the second RRC state.

Clause 2. The method of Clause 1, wherein transmitting the first CSI report includes transmitting the first CSI report via an uplink control channel.

Clause 3. The method of Clause 1, wherein transmitting the second CSI report includes transmitting the second CSI report via an uplink control channel.

Clause 4. The method of Clause 3, further comprising determining that an uplink of the user equipment (UE) is time synchronized when the UE is in the second RRC state.

Clause 5. The method of Clause 1, wherein transmitting the second CSI report includes transmitting the second CSI report based on a random access process.

Clause 6. The method of Clause 5, wherein the random access process corresponds to a truncated four-step random access process without a message Msg 4.

Clause 7. The method of Clause 5, wherein the random access process corresponds to a truncated two-step random access process without a message Msg B.

Clause 8. The method of Clause 5, wherein transmitting the second CSI report includes transmitting the second CSI report via a designated message of a four-step random access process.

Clause 9. The method of Clause 5, wherein transmitting the second CSI report includes transmitting the second CSI report via a designated message of a two-step random access process.

Clause 10. The method of Clause 1, wherein the second configuration parameters are associated with delivery of multicast broadcast service (MBS) data during the second RRC state.

Clause 11. The method of Clause 1, wherein receiving the one or more message includes receiving the one or more messages in response to a multicast broadcast service (MBS) configuration request and wherein the received one or more message include the second configuration parameters.

Clause 12. The method of Clause 1, wherein receiving the one or more message includes receiving a logical multicast control channel carrying a configuration message comprising the second configuration parameters.

Clause 13. The method of Clause 12, wherein the logical multicast control channel further carries scheduling information for receiving multicast broadcast service (MBS) data.

Clause 14. The method of Clause 1, receiving the one or more message includes receiving an RRC release message that includes a command for releasing an RRC connection and wherein the RRC release message comprises the second configuration parameters.

Clause 15. The method of Clause 14, wherein the RRC release message comprises an information element (IE) including the second configuration parameters.

Clause 16. The method of Clause 1, wherein transmitting the second CSI report is based on a random trigger.

Clause 17. The method of Clause 15, wherein the random trigger is based on an identifier of the UE.

Clause 18. The method of Clause 17, wherein the identifier of the UE is a cell random network temporary identifier (C-RNTI).

Clause 19. The method of Clause 17 further comprising determining a probability value indicative of the random trigger based on a seed value, wherein the seed value corresponds to the identifier of the UE.

Clause 20. The method of Clause 1, wherein transmitting the second CSI report includes transmitting the second CSI report in response to a request from a base station (BS).

Clause 21. The method of Clause 1, wherein the second CSI report is transmitted semi-persistently.

Clause 22. The method of Clause 1 further comprising receiving first scheduling information, in response to transmitting the first CSI report, wherein the first scheduling information indicates a first transmission configuration indication (TCI) state associated with one or more first transmission reception points (TRPs).

Clause 23. The method of Clause 22 further comprising receiving first data via the one or more TRPs when in the first RRC state.

Clause 24. The method of Clause 22, wherein the one or more first TRPs are associated with one or more first distributed units (DUs) of a base station.

Clause 25. The method of Clause 22, wherein receiving first scheduling information includes receiving first scheduling information via at least one first downlink control information (DCI) that comprises a first field indicating the first transmission configuration indication (TCI) state.

Clause 26. The method of Clause 22, wherein receiving the first scheduling information includes receiving first scheduling information based on a plurality of CSI reports.

Clause 27. The method of Clause 1 further comprising receiving second scheduling information, in response to transmitting the second CSI report, wherein the second scheduling information indicates a second TCI state associated with one or more second TRPs.

Clause 28. The method of Clause 27 further comprising receiving second data, when in the RRC idle state or when in the RRC inactive state, via the one or more second TRPs.

Clause 29. The method of Clause 27, wherein the one or more second TRPs are associated with one or more second DUs of the base station.

Clause 30. The method of Clause 27, wherein the second scheduling Information is received via at least one second DCI that comprises a second field indicating the second TCI state.

Clause 31. The method of Clause 27, wherein receiving the second scheduling information is based on a second plurality of CSI reports, from a second plurality of UEs, the second plurality of CSI reports including the second CSI report by the UE.

Clause 32. The method of Clause 1, wherein the first configuration parameters comprise first quasi-colocation configuration parameters.

Clause 33. The method of Clause 32, wherein the first quasi-colocation configuration parameters indicate a first plurality of TCI states.

Clause 34. The method of Clause 1, wherein the second configuration parameters comprise second quasi-colocation configuration parameters.

Clause 35. The method of Clause 34, wherein the second quasi-colocation configuration parameters indicate a second plurality of TCI states.

Clause 36. The method of Clause 1, wherein receiving the one or more messages occurs while the UE is in the first RRC state.

Clause 37. The method of Clause 1, wherein the first RRC state corresponds to an RRC connected state.

Clause 38. The method of Clause 1, wherein the second RRC state corresponds to at least one of an RRC idle state or an RRC inactive state.

Clause 39. A method of channel state information (CSI) feedback for multicast broadcast services (MBS) comprising:

receiving, by a user equipment (UE), configuration parameters for a channel state information-reference signal (CSI-RS) measurement and a CSI report associated with multicast broadcast services (MBSs);

determining, based on the received configuration parameters, a CSI report associated with the MBSs for transmission at a first timing; and dropping the CSI report where the first timing of the CSI report collides with a second timing associated with at least one of an uplink channel or an uplink signal.

Clause 40. The method of Clause 39, wherein the dropping the CSI report is further based on the CSI report being associated with the multicast and broadcast service (MBS) services.

Clause 41. The method of Clause 39, wherein the dropping the CSI report is further based on a priority associated with the uplink channel or the uplink signal.

Clause 42. The method of Clause 39, wherein the first timing of the CSI report collides with the second timing of the uplink channel when one or more first symbols of a first uplink channel, used for transmission of the CSI report, collides with one or more second symbols of the uplink channel.

Clause 43. The method of Clause 42, wherein the first timing of the CSI report collides with the second timing of the uplink signal when one or more first symbols of the first uplink channel, used for transmission of the CSI report, collides with one or more second symbols of the uplink signal.

Clause 44. The method of Clause 42, wherein the first uplink channel is an uplink control channel.

Clause 45. The method of Clause 42, wherein the first uplink channel is an uplink shared channel.

Clause 46. An apparatus for utilization in wireless communications comprising:

an antenna for use in transmission of electromagnetic signals;

a memory for maintaining computer-readable code; and a processor for executing the computer-readable code that causes the apparatus to:

receive one or more messages comprising:

first configuration parameters for channel state information-reference signal (CSI-RS) measurement and CSI report in a first radio resource control (RRC) state; and second configuration parameters for the CSI-RS measurement and the CSI report in a second RRC state;

transmit a first CSI report, based on the first configuration parameters, when the UE is in the first RRC state; and transmit a second CSI report, based on the second configuration parameters, when the UE is in the second RRC state.

Clause 47. The apparatus of Clause 46, wherein the apparatus transmits the first CSI report via an uplink control channel.

Clause 48. The apparatus of Clause 46, wherein the apparatus transmits the second CSI report via an uplink control channel.

Clause 49. The apparatus of Clause 46, wherein the apparatus determines an uplink of the user equipment (UE) is time synchronized when the UE is in the second RRC state.

Clause 50. The apparatus of Clause 46, wherein the apparatus transmits the second CSI report based on a random access process.

Clause 51. The apparatus of Clause 50, wherein the random access process corresponds to a truncated four-step random access process without a message Msg 4.

Clause 52. The apparatus of Clause 50, wherein the random access process corresponds to a truncated two-step random access process without a message Msg B.

Clause 53. The apparatus of Clause 50, wherein the apparatus transmits the second CSI report via a designated message of a four-step random access process.

Clause 54. The apparatus of Clause 50, wherein the apparatus transmits the second CSI report via a designated message of a two-step random access process.

Clause 55. The apparatus of Clause 46, wherein the second configuration parameters are associated with delivery of multicast broadcast service (MBS) data during the second RRC state.

Clause 56. The apparatus of Clause 46, wherein receiving the one or more message includes receiving the one or more messages in response to a multicast broadcast service (MBS) configuration request and wherein the received one or more message include the second configuration parameters.

Clause 57. The apparatus of Clause 46, wherein the apparatus receives a logical multicast control channel carrying a configuration message comprising the second configuration parameters.

Clause 58. The apparatus of Clause 57, wherein the logical multicast control channel further carries scheduling information for receiving multicast broadcast service (MBS) data.

Clause 59. The apparatus of Clause 46, receiving the one or more message includes receiving an RRC release message that includes a command for releasing an RRC connection and wherein the RRC release message comprises the second configuration parameters.

Clause 60. The apparatus of Clause 59, wherein the RRC release message comprises an information element (IE) including the second configuration parameters.

Clause 61. The apparatus of Clause 46, wherein transmitting the second CSI report is based on a random trigger.

Clause 62. The apparatus of Clause 61, wherein the random trigger is based on an identifier of the UE.

Clause 63. The apparatus of Clause 62, wherein the identifier of the UE is a cell random network temporary identifier (C-RNTI).

Clause 64. The apparatus of Clause 62, wherein the apparatus determines a probability value indicative of the random trigger based on a seed value, wherein the seed value corresponds to the identifier of the UE.

Clause 65. The apparatus of Clause 46, wherein transmitting the second CSI report includes transmitting the second CSI report in response to a request from a base station (BS).

Clause 66. The apparatus of Clause 46, wherein the second CSI report is transmitted semi-persistently.

Clause 67. The apparatus of Clause 46, wherein the apparatus receives first scheduling information, in response to transmitting the first CSI report, wherein the first scheduling information indicates a first transmission configuration indication (TCI) state associated with one or more first transmission reception points (TRPs).

Clause 68. The apparatus of Clause 67, wherein the apparatus receives first data via the one or more TRPs when in the first RRC state.

Clause 69. The apparatus of Clause 67, wherein the one or more first TRPs are associated with one or more first distributed units (DUs) of a base station.

Clause 70. The apparatus of Clause 67, wherein the apparatus receives first scheduling information includes receiving first scheduling information via at least one first downlink control information (DCI) that comprises a first field indicating the first transmission configuration indication (TCI) state.

Clause 71. The apparatus of Clause 67, wherein the apparatus receives first scheduling information based on a plurality of CSI reports.

Clause 72. The apparatus of Clause 46, wherein the apparatus receives second scheduling information, in response to transmitting the second CSI report, wherein the second scheduling information indicates a second TCI state associated with one or more second TRPs.

Clause 73. The apparatus of Clause 72, wherein the apparatus receives second data, when in the RRC idle state or when in the RRC inactive state, via the one or more second TRPs.

Clause 74. The apparatus of Clause 72, wherein the one or more second TRPs are associated with one or more second DUs of the base station.

Clause 75. The apparatus of Clause 72, wherein the second scheduling information is received via at least one second DCI that comprises a second field indicating the second TCI state.

Clause 76. The apparatus of Clause 72, wherein the apparatus receives the second scheduling information is based on a second plurality of CSI reports, from a second plurality of UEs, the second plurality of CSI reports including the second CSI report by the UE.

Clause 77. The apparatus of Clause 46, wherein the first configuration parameters comprise first quasi-colocation configuration parameters.

Clause 78. The apparatus of Clause 77, wherein the first quasi-colocation configuration parameters indicate a first plurality of TCI states.

Clause 79. The apparatus of Clause 46, wherein the second configuration parameters comprise second quasi-colocation configuration parameters.

Clause 80. The apparatus of Clause 79, wherein the second quasi-colocation configuration parameters indicate a second plurality of TCI states.

Clause 81. The apparatus of Clause 46, wherein the apparatus receives the one or more messages in the first RRC state.

Clause 82. The apparatus of Clause 46, wherein the first RRC state corresponds to an RRC connected state.

Clause 83. The apparatus of Clause 46, wherein the second RRC state corresponds to at least one of an RRC idle state or an RRC inactive state.

Clause 84. An apparatus for utilization in wireless communications comprising:

an antenna for use in transmission of electromagnetic signals;

a memory for maintaining computer-readable code; and a processor for executing the computer-readable code that causes the apparatus to: receive, configuration parameters for a channel state information-reference signal (CSI-RS) measurement and a CSI report associated with multicast broadcast services (MBSs);

determine based on the received configuration parameters, a CSI report associated with the MBSs for transmission at a first timing; and drop the CSI report where the first timing of the CSI report collides with a second timing associated with at least one of an uplink channel or an uplink signal.

Clause 85. The apparatus of Clause 84, wherein the apparatus drops the CSI report based on the CSI report being associated with the multicast and broadcast service (MBS) services.

Clause 86. The apparatus of Clause 84, wherein the apparatus drops the CSI report based on a priority associated with the uplink channel or the uplink signal.

Clause 87. The apparatus of Clause 84, wherein the first timing of the CSI report collides with the second timing of the uplink channel when one or more first symbols of a first uplink channel, used for transmission of the CSI report, collides with one or more second symbols of the uplink channel.

Clause 88. The apparatus of Clause 84, wherein the first timing of the CSI report collides with the second timing of the uplink signal when one or more first symbols of the first uplink channel, used for transmission of the CSI report, collides with one or more second symbols of the uplink signal.

Clause 89. The apparatus of Clause 87, wherein the first uplink channel is an uplink control channel.

Clause 90. The apparatus of Clause 87, wherein the first uplink channel is an uplink shared channel.

Clause 91. A method of channel state information (CSI) feedback comprising: transmitting, by a base station, one or more messages comprising:

first configuration parameters for channel state information-reference signal (CSI-RS) measurement and CSI report in a first radio resource control (RRC) state; and second configuration parameters for the CSI-RS measurement and the CSI report in a second RRC state;

receiving a first CSI report, based on the first configuration parameters, when the UE is in the first RRC state; and receiving a second CSI report, based on the second configuration parameters, when the UE is in the second RRC state.

Clause 92. A method of channel state information (CSI) feedback for multicast broadcast services (MBS) comprising:

transmitting, by a base station, configuration parameters for a channel state information-reference signal (CSI-RS) measurement and a CSI report associated with multicast broadcast services (MBSs), wherein a CSI report associated with the MBSs for transmission at a first timing is determined based on the configuration parameters, and wherein the CSI report where the first timing of the CSI report collides with a second timing associated with at least one of an uplink channel or an uplink signal is dropped.

Clause 93. A method for providing user equipment (UE) feedback, comprising:

receiving, by a UE, one or more messages comprising:

one or more first configuration parameters for first UE feedback in a radio resource control (RRC) connected state; and one or more second configuration parameters for second UE feedback in an RRC idle state or an RRC inactive state;

transmitting, by the UE, the first UE feedback, based on the one or more first configuration parameters, when the UE is in the RRC connected state; and transmitting, by the UE, the second UE feedback, based on the one or more second configuration parameters, when the UE is in the RRC idle state or when the UE is in the RRC inactive state.

Clause 94. The method of Clause 93, wherein the first UE feedback is a first channel state information (CSI) report, the second UE feedback is a second CSI report, and wherein the one or more first and second configuration parameters include parameters for channel state information-reference signal (CSI-RS) measurements.

Clause 95. The method of Clause 93, wherein the first UE feedback is first Hybrid Automatic Repeat Request (HARQ) feedback, and the second UE feedback is second HARQ feedback.

Clause 96. A method for providing user equipment (UE) feedback associated with multicast broadcast services (MBSs), the method comprising:

receiving, by a UE, one or more configuration parameters for the UE feedback associated with the MBSs;

determining, by the UE, based on the one or more configuration parameters, a first timing for transmission of the UE feedback associated with the MBSs; and dropping the UE feedback associated with the MBSs from transmission at the first timing when the first timing for the UE feedback collides with a second timing for an uplink channel or an uplink signal.

Clause 97. The method of Clause 96, wherein the UE feedback comprises a channel state information (CSI) report, and wherein the one or more configuration parameters comprise a parameter for channel state information-reference signal (CSI-RS) measurement.

Clause 98. The method of Clause 96, wherein the UE feedback comprises Hybrid Automatic Repeat Request (HARQ) feedback.

Clause 99. The method of Clause 96, wherein a priority associated with the uplink channel or the uplink signal is equal to, higher than, or lower than a priority associated with the MBSs.

This application claims the benefit of U.S. Provisional Application No. 63/115,490, filed on Nov. 18, 2020, entitled "CHANNEL STATE INFORMATION (CSI) FEEDBACK FOR MULTICAST," the entirety of which is incorporated by reference herein.

The invention claimed is:

1. A method for a user equipment (UE), comprising:

receiving one or more radio resource control (RRC) messages including first configuration parameters and second configuration parameters for each of a plurality of measurement configurations associated with a plurality of multicast broadcast services (MBSs), the first configuration parameters being for an RRC connected state and the second configuration parameters being for an RRC idle state or an RRC inactive state;

performing first measurements for each of the plurality of MBSs based on the first configuration parameters while the UE is in the RRC connected state;

performing second measurements for each of the plurality of MBSs based on the second configuration parameters while the UE is in the RRC idle state or the RRC inactive state; and dropping one or more measurement reports from at least one of a plurality of first measurement reports associated with the first measurements and a plurality of second measurement reports associated with the second measurements based on a priority associated with at least one of the first configuration parameters or the second configuration parameters.

2. A user equipment (UE) comprising:

an antenna for use in transmitting electromagnetic signals;

a memory for storing computer readable code; and a processor for executing the computer readable code, the computer readable code causing the UE to:

receive one or more radio resource control (RRC) messages including first configuration parameters and second configuration parameters for each of a plurality of measurement configurations associated with a plurality of multicast broadcast services (MBSs), the first configuration parameters being for an RRC connected state and the second configuration parameters being for an RRC idle state or an RRC inactive state;

perform first measurements for each of the plurality of MBSs based on the first configuration parameters while the UE is in the RRC connected state;

perform second measurements for each of the plurality of MBSs based on the second configuration parameters while the UE is in the RRC idle state or the RRC inactive state; and drop one or more measurement reports from at least one of a plurality of first measurement reports associated with the first measurements and a plurality of second measurement reports associated with the second measurements based on a priority associated with at least one of the first configuration parameters or the second configuration parameters.

* * * * *